(12) United States Patent
Takenaka

(10) Patent No.: US 11,333,201 B2
(45) Date of Patent: May 17, 2022

(54) GREASING DEVICE FOR CLUTCH RELEASE MECHANISM

(71) Applicant: TOYOTA JIDOSHA KABUSHIKI KAISHA, Toyota (JP)

(72) Inventor: Tetsuhiro Takenaka, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 378 days.

(21) Appl. No.: 16/434,309

(22) Filed: Jun. 7, 2019

(65) Prior Publication Data

US 2020/0072282 A1 Mar. 5, 2020

(30) Foreign Application Priority Data

Aug. 31, 2018 (JP) .............................. JP2018-163948

(51) Int. Cl.
| | |
|---|---|
| *F16C 33/66* | (2006.01) |
| *F16D 23/14* | (2006.01) |
| *F16N 3/10* | (2006.01) |
| *F16D 13/74* | (2006.01) |
| *F16H 57/04* | (2010.01) |

(52) U.S. Cl.
CPC ...... *F16C 33/6622* (2013.01); *F16C 33/6614* (2013.01); *F16D 13/74* (2013.01); *F16D 23/14* (2013.01); *F16N 3/10* (2013.01); *F16C 2361/43* (2013.01); *F16D 2023/141* (2013.01); *F16H 57/04* (2013.01)

(58) Field of Classification Search
CPC ... F16N 3/10; F16N 5/00; F16D 13/42; F16D 13/583; F16D 13/585; F16D 13/64; F16D 13/71; F16D 13/74; F16D 23/14; F16D 2023/141; F16D 13/683; F16C 13/70; F16C 33/6614; F16C 2361/43; F16C 33/6622; F16H 57/04
USPC ........ 384/473, 627; 192/85.51, 85.54, 89.26, 192/98, 99 S, 113.5, 110 B
See application file for complete search history.

(56) References Cited

U.S. PATENT DOCUMENTS

| | | | | |
|---|---|---|---|---|
| 5,908,097 A | * | 6/1999 | Grosspietsch | ........ F16D 25/083 192/85.51 |
| 5,947,251 A | * | 9/1999 | Goins | ..................... F16D 13/48 192/89.26 |
| 2003/0127298 A1 | * | 7/2003 | Grillo | ..................... F16D 23/12 192/98 |

(Continued)

FOREIGN PATENT DOCUMENTS

| | | | | |
|---|---|---|---|---|
| CN | 108194529 A | * | 6/2018 | ............. F16D 13/74 |
| CN | 109681756 A | * | 4/2019 | ........... F16N 33/100 |

(Continued)

*Primary Examiner* — Marcus Charles
(74) *Attorney, Agent, or Firm* — Oliff PLC

(57) ABSTRACT

A greasing device for feeding grease to a greasing requiring part accommodated inside a housing, the greasing device including: a first jig; a second jig; and a greasing portion, wherein the first jig has a base portion that abuts on the housing, and an insertion hole that penetrates the base portion, the second jig has an insertion portion that is inserted into the insertion hole of the first jig, and a stopper portion that comes into abutment on the base portion of the first jig when the insertion portion is inserted into the insertion hole, and the greasing portion feeds grease to the greasing requiring part while being positioned by the first jig and the second jig.

20 Claims, 15 Drawing Sheets

(56) References Cited

U.S. PATENT DOCUMENTS

2007/0235280 A1* 10/2007 Otto .................... F16C 33/6607
                                                          192/98
2011/0303476 A1* 12/2011 Jennings ................ F16D 13/74
                                                          180/312

FOREIGN PATENT DOCUMENTS

| | | | | |
|---|---|---|---|---|
| DE | 102014019680 A1 * | 6/2016 | ............ | F16H 57/04 |
| FR | 2975742 A1 * | 11/2012 | ............ | F16D 23/12 |
| JP | S62-039135 A | 2/1987 | | |
| JP | H0280230 U * | 6/1990 | ............ | F16D 23/14 |
| JP | H09-089001 A | 3/1997 | | |
| JP | H10-047380 A | 2/1998 | | |
| JP | 2008-151185 A | 7/2008 | | |
| JP | 2009-144766 A | 7/2009 | | |
| JP | 2010-255772 A | 11/2010 | | |
| JP | 2012132534 A * | 7/2012 | ............ | F16D 23/14 |
| JP | 2012-211609 A | 11/2012 | | |
| KR | 200285108 Y1 * | 9/2002 | ............ | F16D 23/12 |
| WO | WO-2008068122 A1 * | 6/2008 | ............ | F16C 19/54 |
| WO | WO-2014199214 A2 * | 12/2014 | ............ | F16D 23/12 |

\* cited by examiner

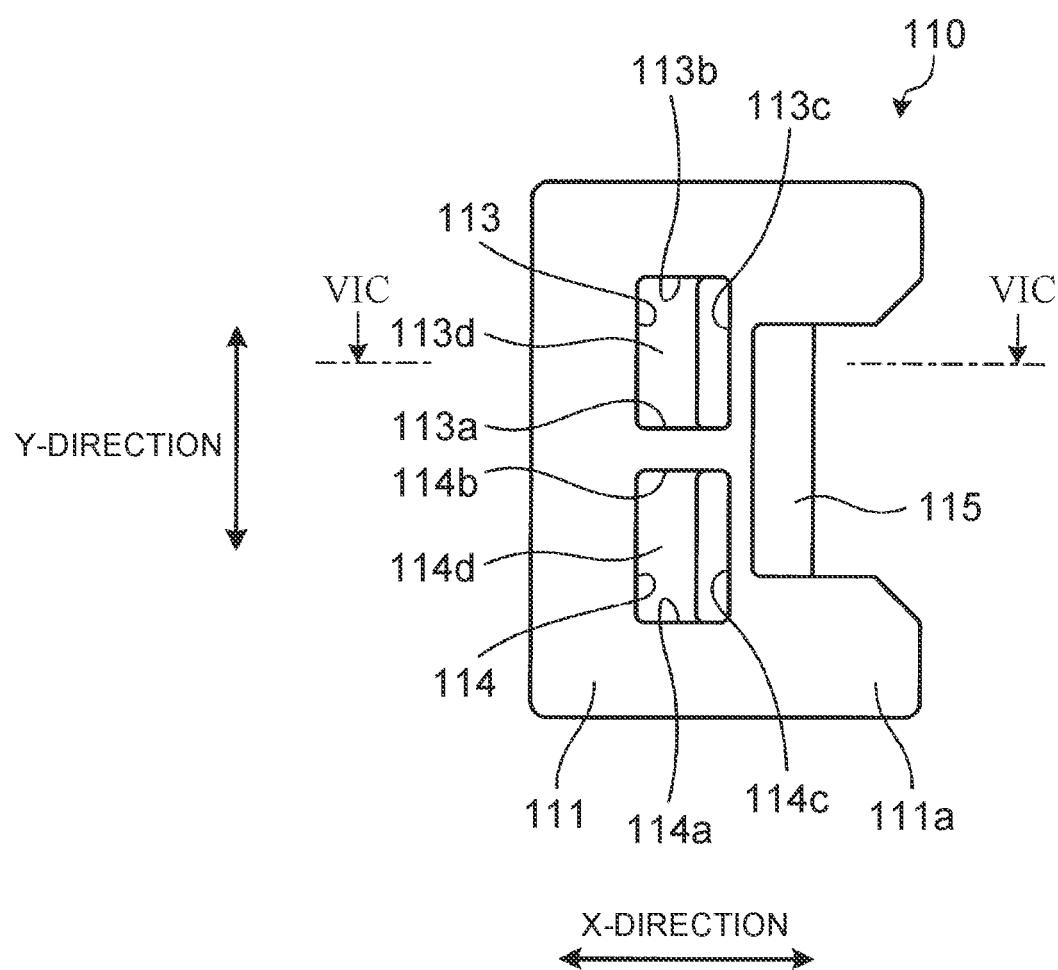

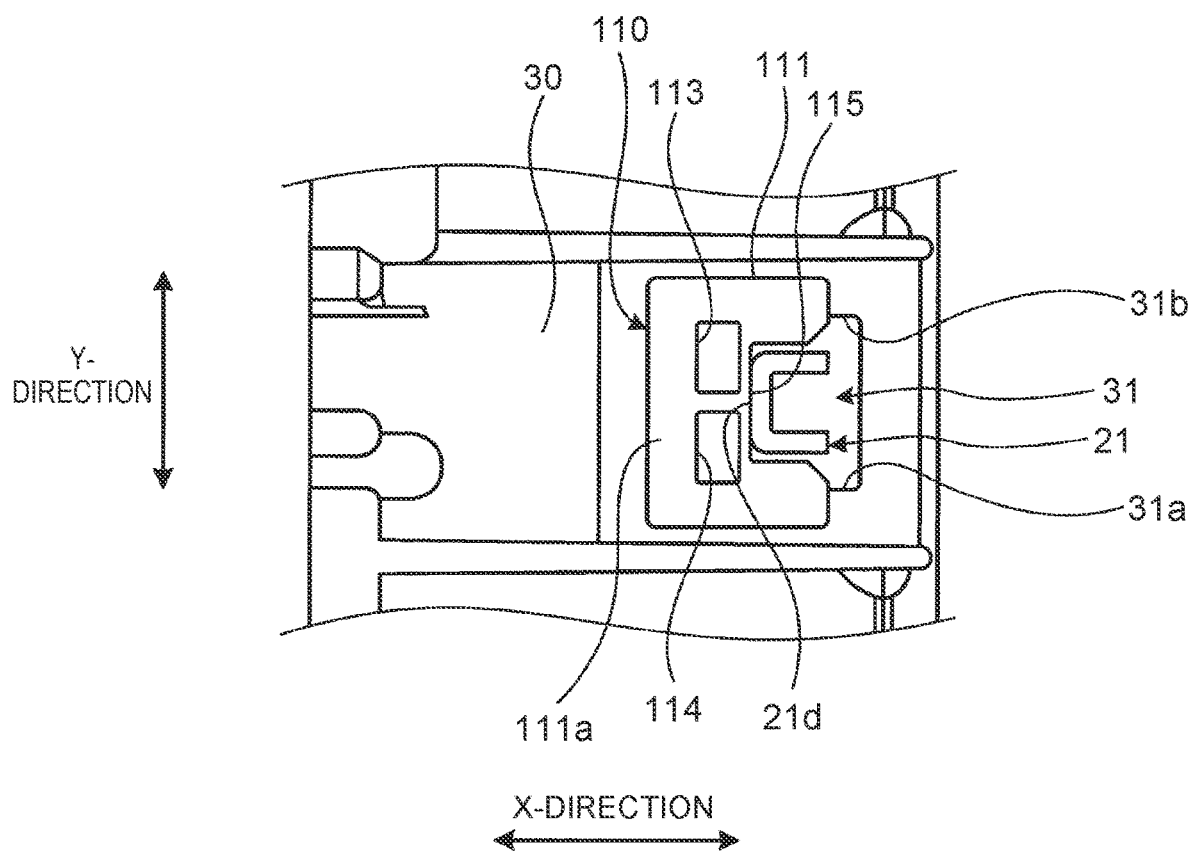

GREASING DEVICE FOR CLUTCH RELEASE MECHANISM

CROSS-REFERENCE TO RELATED APPLICATIONS

This application claims priority to Japanese Patent Application No. 2018-163948 filed on Aug. 31, 2018, which is incorporated herein by reference in its entirety.

BACKGROUND

1. Technical Field

The present disclosure relates to a greasing device for a clutch release mechanism.

2. Description of Related Art

Japanese Patent Application Publication No. 2008-151185 (JP 2008-151185 A) discloses a structure as a clutch release mechanism in which one end of a clutch release fork serves as a pressing part that presses a release bearing while the other end of the clutch release fork protrudes to the outside of a clutch housing.

SUMMARY

In a clutch release mechanism, a clutch release fork and a release bearing slide on each other at the contact portion when a pressing part of the clutch release fork presses the release bearing, which makes it necessary to lubricate this contact portion with a lubricant. For example, in a vehicle equipped with a clutch device that includes a clutch release mechanism in the configuration, a hole for releasing heat resulting from a half-engaged state and an opening for draining water are provided in the clutch housing. When this vehicle is used in an environment where sand, muddy water, etc. are present, foreign objects, such as sand and muddy water, etc. may enter the clutch housing and damage the pressing part of the clutch release fork, causing degradation of the sliding performance. It is therefore desirable that greasing maintenance of additionally feeding grease to the contact portion between the release bearing and the clutch release fork be performed as maintenance work for the clutch release mechanism.

In the configuration described in JP 2008-151185 A, however, additionally feeding grease to the pressing part of the clutch release fork that is a portion requiring greasing, requires detaching and attaching the clutch housing during greasing maintenance. Thus, the clutch housing needs to be removed from the vehicle for each greasing maintenance, which provides room for improvement in terms of work efficiency.

The present disclosure provides a greasing device for a clutch release mechanism that can improve the work efficiency of greasing maintenance.

According to an aspect of the present disclosure, a greasing device is provided that feeds grease to a contact portion between a release bearing and a pressing part of a clutch release fork in a clutch release mechanism in which the pressing part presses the release bearing. This greasing device includes a greasing pipe and a positioning part. The greasing pipe is configured to extend from the outside of a clutch housing that houses a clutch main body including the release bearing toward the contact portion through a through-hole provided in the clutch housing, and to feed grease to the contact portion. The positioning part is configured to position the greasing pipe by coming into contact with each of an inner surface of the through-hole and a flat surface of the clutch release fork.

This configuration of the greasing device allows grease to be fed from the greasing pipe to the contact portion between the pressing part of the clutch release fork and the release bearing through the through-hole of the clutch housing. Thus, it is possible to perform greasing work without removing the clutch housing during greasing maintenance, which improves the work efficiency of the greasing maintenance.

In the above greasing device, the positioning part may include a first jig and a second jig. The first jig may be provided with two or more positioning holes for positioning the greasing pipe. The second jig may include an insertion part that is inserted into the positioning hole, and may be configured such that the greasing pipe is positioned as the insertion part comes into contact with an inner surface of the positioning hole. The greasing pipe may be fixed to the second jig and extend along the insertion part.

In this configuration of the greasing device, the insertion part of the second jig is brought into contact with the inner surface of the positioning hole of the first jig, and thereby the greasing pipe can be positioned at the contact portion between the pressing part of the clutch release fork and the release bearing that is a portion requiring greasing. Thus, the work efficiency of greasing maintenance improves.

In the above greasing device, the pressing part may have a two-pronged structure. The positioning holes may include a first hole and a second hole. The insertion part may be inserted into the first hole to grease one prong of the two-pronged pressing part. The insertion part may be inserted into the second hole to grease the other prong of the two-pronged pressing part.

In this configuration of the greasing device, the insertion part of the second jig is inserted into the first hole or the second hole of the first jig, and thereby the greasing pipe can be positioned at the contact portion between the pressing part of the clutch release fork and the release bearing that is a portion requiring greasing. Thus, the work efficiency of greasing maintenance improves.

In the above greasing device, the inner surface of the positioning hole may include a guide surface configured to allow the greasing pipe to be positioned at such a position that the greasing pipe does not come into contact with a component of the release bearing.

In this configuration of the greasing device, bringing the insertion part of the second jig into contact with the guide surface of the positioning hole of the first jig enables the greasing pipe to avoid coming into contact with a component of the release bearing before reaching a portion requiring greasing.

In the above greasing device, the greasing pipe may be integrated with the positioning part. The pressing part may have a two-pronged structure. The positioning part may include a first contact surface and a second contact surface. The first contact surface may come into contact with the flat surface of the clutch release fork in a first state where the positioning part is mounted in the through-hole to grease one prong of the two-pronged pressing part. The second contact surface may come into contact with the flat surface of the clutch release fork in a second state where the positioning part is mounted in the through-hole to grease the other prong of the two-pronged pressing part. Here, the second state may be a state where the integrated greasing pipe and positioning part are turned 180 degrees from the first state.

In this configuration of the greasing device, the greasing pipe can be positioned in the first state as the first contact surface of the positioning part comes into contact with the flat surface of the clutch release fork, and the greasing pipe can be positioned in the second state as the second contact surface of the positioning part comes into contact with the flat surface of the clutch release fork. Moreover, since the greasing pipe is integrated with the positioning part, one can remove the positioning part along with the greasing pipe from the through-hole of the clutch housing when pulling the greasing pipe out of the through-hole of the clutch housing.

In the above greasing device, a leading end portion of the greasing pipe may have an opening shaped so as to taper toward a leading end.

In this configuration of the greasing device, the greasing pipe including the tapered leading end portion allows for greasing of a portion requiring greasing through a narrow space.

In the above greasing device, the greasing pipe may be made of metal. Here, the metal greasing pipe may have a linear or curvilinear shape.

This configuration of the greasing device can reduce the deformation of the greasing pipe during greasing maintenance caused by interference with a member inside the clutch housing etc.

In the above greasing device, the greasing pipe may be made of elastic material. Here, the greasing pipe made of elastic material may have a linear or curvilinear shape.

This configuration of the greasing device allows the greasing pipe to be deformed along the shape of a narrow space during greasing of such a space. Thus, the leading end portion of the greasing pipe can be easily approached to a portion requiring greasing, which improves the work efficiency of greasing maintenance.

The above greasing device may further include an imaging device that takes an image of an internal structure of the clutch housing on a leading end side of the greasing pipe.

This configuration of the greasing device allows clutch components present on the leading end side of the greasing pipe to be known through an image of the internal structure of the clutch housing taken by the imaging device. Thus, a portion requiring greasing can be reliably greased.

The present disclosure improves the work efficiency of greasing maintenance by making it possible to feed grease to a contact portion between a pressing part of a clutch release fork and a release bearing without removing a clutch housing during the greasing maintenance.

The invention relates to a greasing device for feeding grease to a greasing requiring part accommodated inside a housing. The greasing device is equipped with a first jig, a second jig, and a greasing portion. The greasing device is characterized in that the first jig has a base portion that abuts on the housing, and an insertion hole that penetrates the base portion, that the second jig has an insertion portion that is inserted into the insertion hole of the first jig, and a stopper portion that comes into abutment on the base portion of the first jig when the insertion portion is inserted into the insertion hole, and that the greasing portion feeds grease to the greasing requiring part while being positioned by the first jig and the second jig.

According to this configuration, the greasing portion can feed grease to the greasing requiring part accommodated inside the housing, while being positioned by the first jig having the base portion abutting on the housing, and the second jig having the insertion portion inserted in the insertion hole of the first jig. Thus, the greasing operation can be performed without removing the housing at the time of greasing maintenance, so the operability of greasing maintenance is enhanced.

Besides, the greasing portion may be a greasing pipe inserted through the insertion portion of the second jig.

According to this configuration, the greasing pipe can be positioned at the greasing requiring part by inserting the insertion portion of the second jig into the insertion hole of the first jig, so the operability of greasing maintenance is enhanced.

Besides, the housing may be provided with a hole, the first jig may have a protrusion portion that protrudes from the base portion and that is inserted into the hole of the housing, and a lateral surface of the protrusion portion may abut on an inner surface of the hole.

According to this configuration, the greasing pipe can be positioned at the greasing requiring part by inserting the protrusion portion of the first jig into the hole of the housing and ensuring that the lateral surface of the protrusion portion abuts on the inner surface of the hole, so the operability of greasing maintenance is enhanced.

Besides, the first jig may be provided with a plurality of insertion holes identical to the insertion hole.

According to this configuration, the insertion hole into which the insertion portion of the second jig is inserted can be replaced with another insertion hole, depending on the position of the greasing requiring part.

Besides, the first jig may have a key portion that holds the first jig on the housing when the protrusion portion is inserted into the hole of the housing, and the key portion may be provided on a tip side of the protrusion portion, and may be shaped in such a manner as to extend outward of an opening portion of the hole with the protrusion portion inserted in the hole.

According to this configuration, the key portion is caught by the housing with the protrusion portion of the first jig inserted in the hole of the housing, so the first jig can be held through the hole of the housing.

Besides, the greasing device may be equipped with photographing means for photographing an internal structure of the housing on a tip side of the greasing pipe.

According to this configuration, a member present on the tip side of the greasing pipe can be grasped from an image of the internal structure of the housing photographed by the photographing means. Thus, grease can be reliably fed to the greasing requiring part.

Besides, the invention also relates to a greasing method for feeding grease to a greasing requiring part accommodated inside a housing. The greasing method includes a first step of attaching a first jig having a base portion and an insertion hole to the housing, a second step of inserting a greasing pipe and a second jig into the insertion hole of the first jig with the first jig attached to the housing, and a third step of feeding grease to the greasing requiring part from the greasing pipe. The greasing method is characterized in that the second step includes a step of inserting an insertion portion of the second jig into the insertion hole of the first jig to a position where a stopper portion of the second jig abuts on the base portion of the first jig.

According to this configuration, when grease is fed to the greasing requiring part accommodated inside the housing, the second jig and the greasing pipe are inserted in the insertion portion of the first jig with the first jig attached to the housing, so grease can be fed to the greasing requiring part from the greasing pipe positioned by the first jig and the second jig. Thus, the greasing operation can be performed without removing the housing at the time of greasing maintenance, so the operability of greasing maintenance is enhanced.

Besides, the insertion hole may have a first hole and a second hole that penetrate the base portion, and the greasing method may further include a step of performing the second step and the third step for the second hole with the first jig attached to the housing, after performing the first to third steps for the first hole.

According to this configuration, when the destination of insertion of the insertion portion of the second jig is changed over from the first hole to the second hole, the first jig remains attached to the housing, so the operability of greasing maintenance is enhanced.

Besides, the housing may be provided with a hole, the first jig may have a protrusion portion that protrudes from the base portion and that is inserted into the hole of the housing, and a key portion that holds the first jig on the housing when the protrusion portion is inserted into the hole of the housing, the key portion may be provided on a tip side of the protrusion portion, and may be shaped in such a manner as to extend outward of an opening portion of the hole with the protrusion portion inserted in the hole, and the first step may include a step of holding the first jig on the housing by the key portion.

According to this configuration, the greasing pipe can be positioned at the greasing requiring part by inserting the protrusion portion of the first jig into the hole of the housing and ensuring that the lateral surface of the protrusion portion abuts on the inner surface of the hole, so the operability of greasing maintenance is enhanced. Besides, the key portion is caught by the housing with the protrusion portion of the first jig inserted in the hole of the housing, so the first jig can be held through the hole of the housing.

Besides, the greasing method may further include a step of photographing an internal structure of the housing by photographing means for photographing the internal structure of the housing on a tip side of the greasing pipe.

According to this configuration, a member present on the tip side of the greasing pipe can be grasped from an image of the internal structure of the housing photographed by the photographing means. Thus, grease can be reliably fed to the greasing requiring part.

Effect of the Invention

According to the invention, grease can be fed to the greasing requiring part without the need to remove the housing at the time of greasing maintenance, so the operability of greasing maintenance is enhanced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a plan view of a base end side of a first jig of the greasing device;

FIG. 7 is a view showing a state where the first jig is mounted in a through-hole of a clutch housing shown in FIG. 1;

DETAILED DESCRIPTION OF EMBODIMENTS

In the following, greasing device and greasing method according to embodiments of the present disclosure will be specifically described with reference to the drawings. However, the present disclosure is not limited to the following embodiments.

Figure 1:
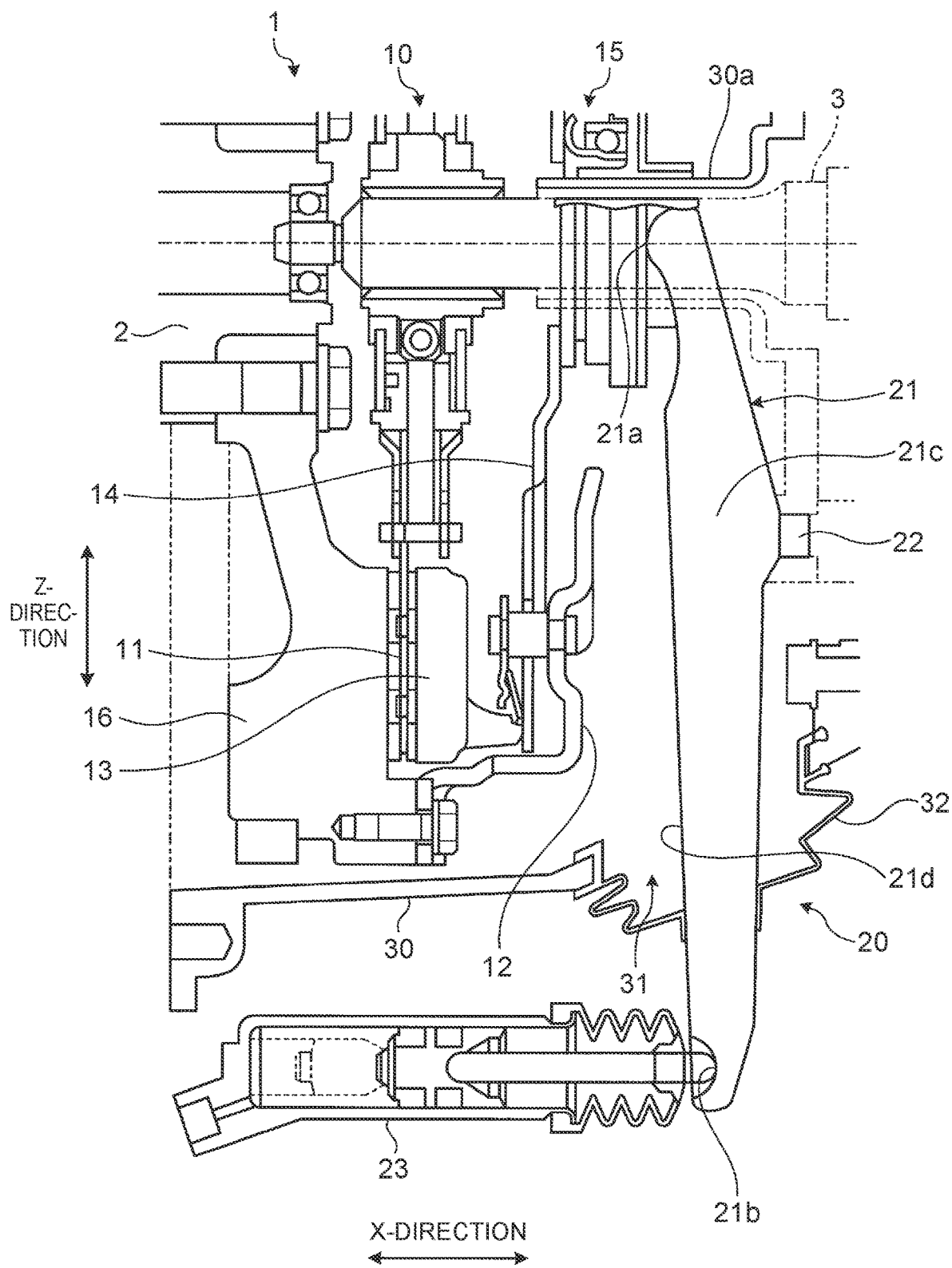
FIG. 1 is a view schematically showing a clutch release mechanism of a first embodiment of the present disclosure.

A first embodiment of the present disclosure will be described below. FIG. 1 is a view schematically showing a clutch release mechanism of the first embodiment. As shown in FIG. 1, a clutch device 1 includes a clutch main body 10 that acts so as to continue or interrupt power transmission, a clutch release mechanism 20 that manipulates the clutch main body 10, and a clutch housing 30 that houses the clutch main body 10. For example, the clutch device 1 is installed in a manual transmission vehicle and disposed between an engine and a transmission.

The X-direction and the Z-direction indicated in FIG. 1 respectively represent an axial direction along a center axis and a direction orthogonal to the center axis (also referred to as a radial direction or a height direction). When the Z-direction is the height direction, the upper side and the lower side may be written as a leading end side and a base end side, respectively. A Y-direction to be described later represents a direction orthogonal to both the X-direction and the Z-direction. The Y-direction may be written as a width direction.

The clutch main body 10 includes a clutch disc 11, a clutch cover 12, a pressure plate 13, a diaphragm spring 14, and a release bearing 15.

The clutch disc 11 includes a friction surface (clutch facing) sandwiched between the pressure plate 13 and a flywheel 16, and is spline-fitted with an input shaft 3 of the transmission. Rotation of the flywheel 16 is transmitted to the input shaft 3 through a frictional force generated between the friction surface of the clutch disc 11 and the flywheel 16. The flywheel 16 is fastened with bolts to a crankshaft 2 of the engine, and the flywheel 16 and the crankshaft 2 rotate integrally.

The clutch cover 12 is provided so as to cover an outer circumferential side of the clutch disc 11, and rotates integrally with the pressure plate 13 and the diaphragm spring 14. The pressure plate 13 is provided between the friction surface of the clutch disc 11 and the diaphragm spring 14. The diaphragm spring 14 is a member that presses the friction surface of the clutch disc 11 against the flywheel 16 through the pressure plate 13. The diaphragm spring 14 is provided on the opposite side of the pressure plate 13 from the friction surface of the clutch disc 11. A circumferential edge portion of the diaphragm spring 14 is connected to the pressure plate 13, while a center portion of the diaphragm spring 14 is connected to the release bearing 15. Thus, the diaphragm spring 14 can press the pressure plate 13.

During engagement of the clutch main body 10, the pressure plate 13 presses the friction surface of the clutch disc 11 against the flywheel 16 by an elastic force of the diaphragm spring 14. This results in a connected state where a frictional force is generated between the friction surface of the clutch disc 11 and the flywheel 16 and rotation of the flywheel 16 is transmitted to the clutch disc 11.

During disengagement of the clutch main body 10, the release bearing 15 presses the center portion of the diaphragm spring 14, so that the circumferential edge portion of the diaphragm spring 14 is shifted in a direction away from the flywheel 16. At the same time, the pressure plate 13 is drawn in a direction away from the flywheel 16 along with the diaphragm spring 14. This results in a disconnected state where the frictional force between the friction surface of the clutch disc 11 and the flywheel 16 is lost and rotation of the flywheel 16 is not transmitted to the clutch disc 11.

The clutch release mechanism 20 includes a clutch release fork 21, a release fork support 22, and a release cylinder 23.

The clutch release fork 21 is a member that moves the release bearing 15 in the axial direction, and is configured to be swingable in a state of being supported by the release fork support 22. The clutch release fork 21 is an elongated metal member and has a structure with a two-pronged leading end.

As shown in FIG. 1, one end of the clutch release fork 21 is formed by a pressing part 21a that presses the release bearing 15 in the axial direction. The pressing part 21a has a two-pronged structure with a leading end divided into two prongs so as to hold the input shaft 3 therebetween inside the clutch housing 30. A portion (contact portion) of the pressing part 21a that faces the release bearing 15 in the axial direction comes into contact with the release bearing 15. The other end of the clutch release fork 21 is formed by a connection part 21b that protrudes to the outside of the clutch housing 30 through a through-hole 31 of the clutch housing 30 and is connected to the release cylinder 23. The other end of the clutch release fork 21 is covered by a fork boot 32 at a position from which the clutch release fork 21 extends to the outside of the clutch housing 30. The fork boot 32 is mounted in the through-hole 31. The fork boot 32 may be provided with a hole (cooling hole) for releasing friction heat resulting from a half-engaged state of the clutch main body 10 to the outside of the clutch housing 30.

The clutch release fork 21 further includes a fulcrum part 21c at which the clutch release fork 21 is supported by the release fork support 22, between the pressing part 21a and the connection part 21b. The release fork support 22 is composed of a main body that is fixed to a partition wall of the clutch housing 30 and a pivot (not shown) that includes a spherical surface on a leading end side of the main body. The partition wall of the clutch housing 30 is formed by a retainer to which a bearing (not shown) that supports the input shaft 3 is mounted. The retainer is a member fixed to the clutch housing 30. The release fork support 22 is fastened at a root side to the retainer with bolts. Inside the clutch housing 30, a boss 30a of the retainer extends along the input shaft 3. The input shaft 3 is passed through the inside of the boss 30a.

The release bearing 15 is configured to be movable in the axial direction relative to the boss 30a, in a state of being supported on an outer circumference of the boss 30a through a sleeve. The release bearing 15 is disposed so as to come into contact with the center portion of the diaphragm spring 14. The release bearing 15 includes an outer ring that is supported by the sleeve on the boss 30a and an inner ring that comes into contact with the center portion of the diaphragm spring 14. In the release bearing 15, the inner ring that comes into contact with the diaphragm spring 14 rotates, however the outer ring that comes into contact with the clutch release fork 21 does not rotate.

When a driver steps on a clutch pedal (not shown), the release cylinder 23 is operated. When the connection part 21b is manipulated by the release cylinder 23, the clutch release fork 21 swings about the fulcrum part 21c as a fulcrum. This swinging causes the pressing part 21a to press the release bearing 15, which in turn causes the release bearing 15 to move in the axial direction and press the center portion of the diaphragm spring 14 toward the flywheel 16, so that the clutch main body 10 becomes disengaged. When the clutch main body 10 becomes disengaged, a path between the flywheel 16 and the clutch disc 11 is interrupted such that no power can be transmitted therebetween. When the manipulative force from the release cylinder 23 is lost, the release bearing 15 is freed from the pressing force exerted thereon by the pressing part 21a, so that the clutch main body 10 becomes engaged. When the clutch main body 10 becomes engaged, the path between the flywheel 16 and the clutch disc 11 is established such that power can be transmitted therebetween. Thus, as the clutch release fork 21 swings, the power transmission path between the crankshaft 2 on the engine side and the input shaft 3 on the transmission side is established or interrupted.

Next, a greasing device 100 of the first embodiment will be described. The greasing device 100 is a device that feeds grease to a contact portion between the pressing part 21a of the clutch release fork 21 and the release bearing 15. When a vehicle equipped with the clutch device 1 is used in an environment where sand, muddy water, etc. are present, foreign objects may enter the clutch housing 30 through the aforementioned cooling hole of the fork boot 32, a cooling hole or an opening for draining water provided in the clutch housing 30 (none of these holes is shown). It is therefore desirable that greasing maintenance of additionally feeding grease to the contact portion between the clutch release fork 21 and the release bearing 15 be performed as maintenance for the clutch release mechanism 20. The greasing device 100 is configured to allow for greasing maintenance without the need for detaching and attaching the clutch housing 30 from and to the vehicle. The greasing device 100 feeds grease, by means of a greasing pipe 130 (shown in FIG. 2 etc.), to the contact portion between the clutch release fork 21 and the release bearing 15 that is a portion requiring greasing, from the outside of the clutch housing 30 through the through-hole 31 of the clutch housing 30.

Figure 2:
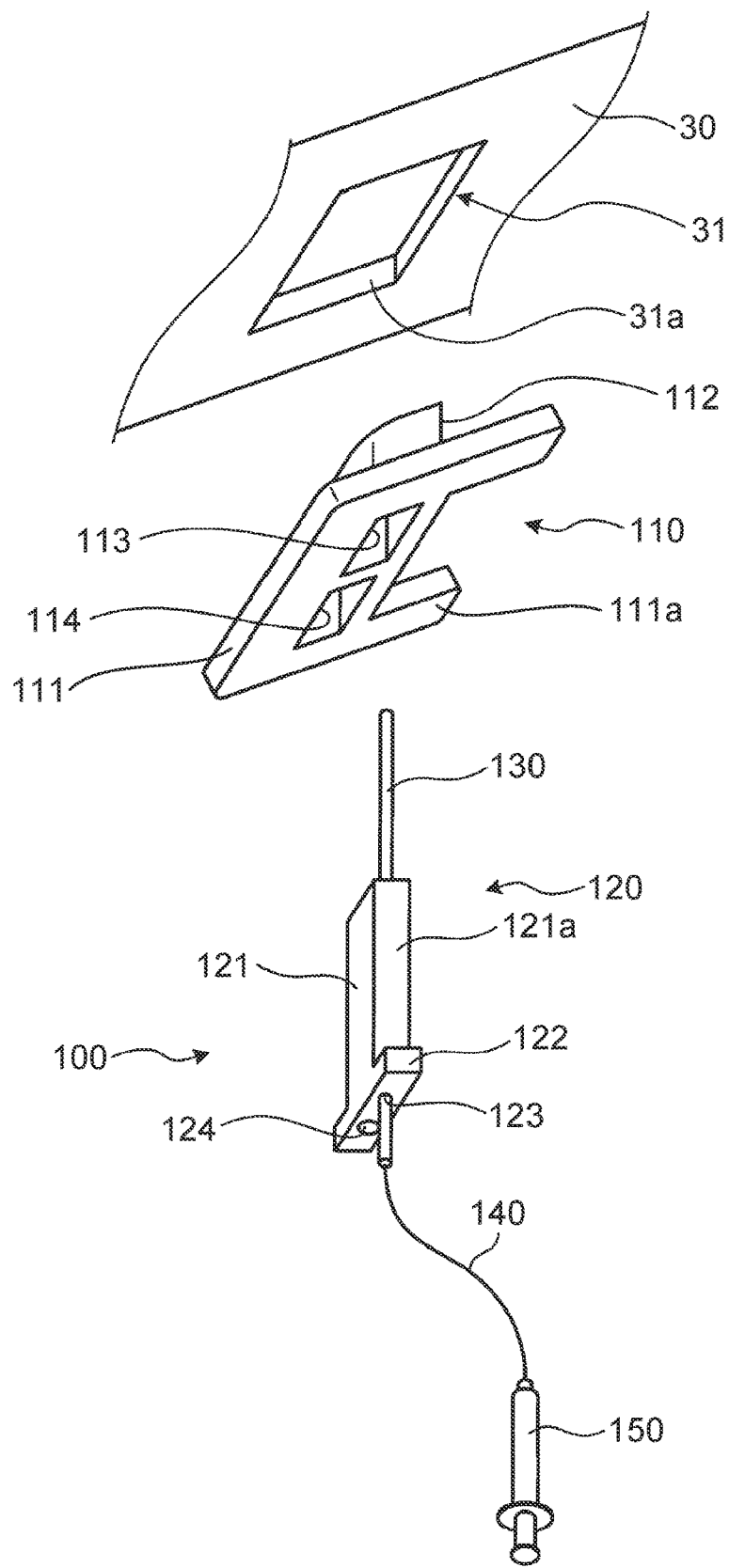
FIG. 2 is a view schematically showing a greasing device for the clutch release mechanism of the first embodiment.

As shown in FIG. 2, the greasing device 100 includes a first jig 110, a second jig 120, the greasing pipe 130, a flexible pipe 140, and a greaser 150. The first jig 110 and the second jig 120 are members that position the greasing pipe 130. The first jig 110 is a member that is mounted in the through-hole 31 of the clutch housing 30. The second jig 120 is a member that is inserted into an insertion hole of the first jig 110.

The first jig 110 includes a base part 111, a protruding part 112, and a first hole 113 and a second hole 114 that are positioning holes. The first jig 110 is an integrally molded part made of metal. The base part 111 has a flat plate shape that can cover a portion of the opening of the through-hole 31. The width (the length in the Y-direction to be described later) of the base part 111 is larger than the opening width of the through-hole 31. The protruding part 112 is a part that protrudes from the base part 111 and is inserted into the through-hole 31. The protruding part 112 comes into contact with an inner surface 31a of the through-hole 31 as well as with a flat surface 21d of the clutch release fork 21. Thus, the protruding part 112 functions as a positioning part that positions the first jig 110.

The first hole 113 and the second hole 114 are insertion holes into which the greasing pipe 130 and an insertion part 121 of the second jig 120 are inserted, and are positioning holes for positioning the greasing pipe 130. The first hole 113 and the second hole 114 are formed side by side in the width direction of the first jig 110, and both are through-holes extending through the first jig 110 from the base part 111 on a base end side toward the protruding part 112 on a leading end side. When the first hole 113 and the second hole 114 are not particularly distinguished from each other, these holes will be written as "insertion holes" in this description.

The second jig 120 includes the insertion part 121 that is inserted into the first hole 113 and the second hole 114 of the first jig 110, and a stopper 122 that comes into contact with a front surface 111a of the first jig 110. The second jig 120 is an integrally molded part made of metal. The greasing pipe 130 is integrated with the second jig 120. The second jig 120 includes two through-holes 123, 124 extending straight along the insertion part 121 from a base end side toward a leading end side. One through-hole 123 is a hole for the greasing pipe. The other through-hole 124 is a hole for an endoscope. The greasing pipe 130 is fixed in the through-hole 123 in an inserted state. An endoscope 160 is fixed in the through-hole 124 in an inserted state (see FIG. 3). The stopper 122 includes a stopper surface 122a (shown in FIG. 3) that comes into contact with the front surface 111a of the first jig 110.

The greasing pipe 130 is a pipe through which grease is fed to the contact portion between the pressing part 21a of the clutch release fork 21 and the release bearing 15 inside the clutch housing 30. The greasing pipe 130 is made of metal. An opening 131a (shown in FIG. 4A and FIG. 4B) through which grease is ejected is provided in a leading end portion 131 of the greasing pipe 130. The flexible pipe 140 is connected to a base end of the greasing pipe 130. The greasing pipe 130 is connected to the greaser 150 through the flexible pipe 140.

Figure 3:
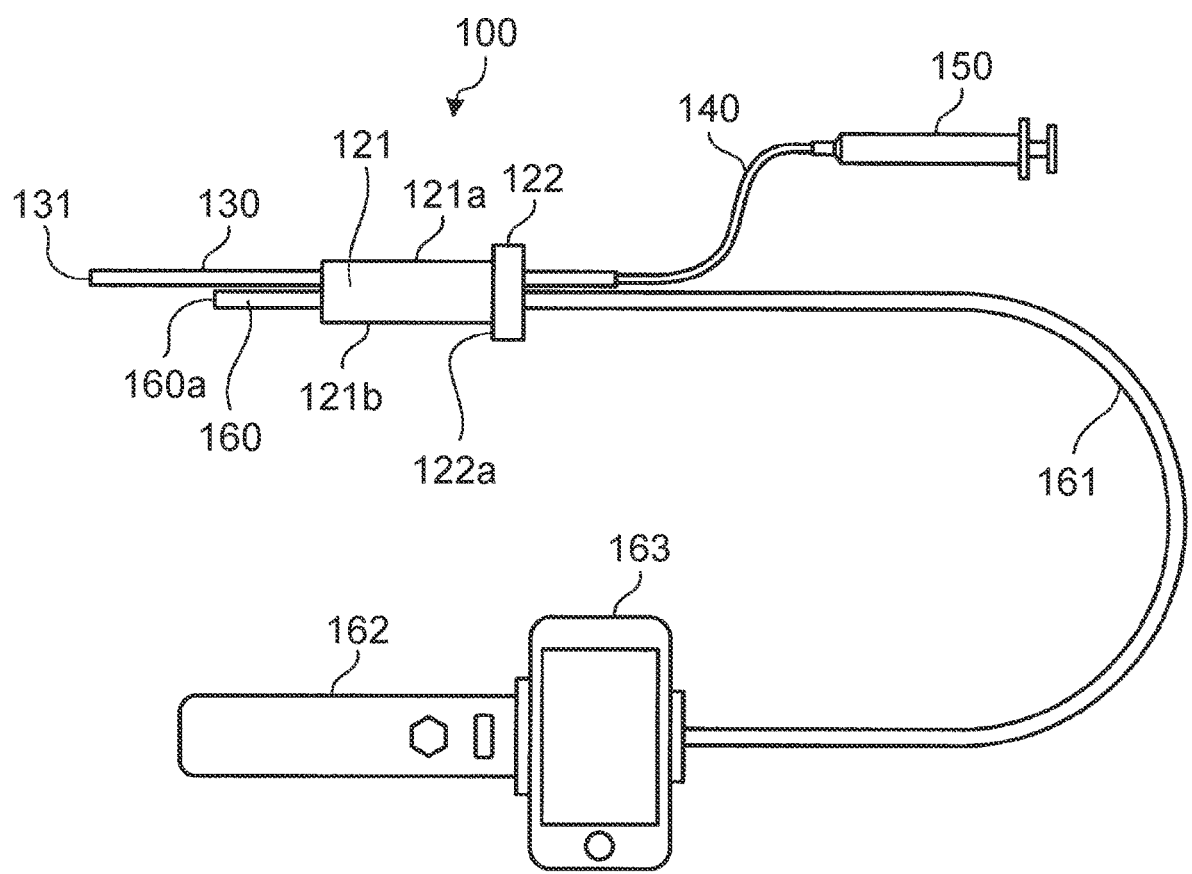
FIG. 3 is a schematic view illustrating the greasing device.

As shown in FIG. 3, the greasing device 100 includes the endoscope 160 as imaging means. The endoscope 160 is integrated with the second jig 120 and protrudes from the leading end side of the insertion part 121. A leading end of the endoscope 160 is a portion that is inserted into the clutch housing 30, and a lens is provided at a leading end portion 160a. A base end of the endoscope 160 is connected to a manipulation unit 162 through a cable 161. It is possible to take an image of an internal structure of the clutch housing 30 by the endoscope 160 through manipulation of the manipulation unit 162. Images taken by the endoscope 160 can be displayed on a display unit 163 mounted on the manipulation unit 162.

The greaser 150 is composed of a cylinder and a piston. The flexible pipe 140 is connected to the cylinder of the greaser 150. Pressing the piston with the cylinder filled with grease can feed the grease from the greaser 150 to the greasing pipe 130. It is possible to smoothly feed grease, for example, by filling the greasing pipe 130 and the flexible pipe 140 with grease in advance, and in this state inserting the greasing pipe 130 into the clutch housing 30 through the through-hole 31 and manipulating the greaser 150.

Figure 4A:
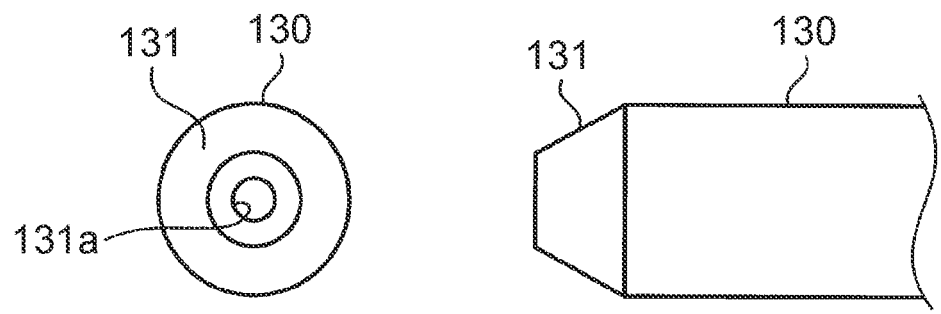
FIG. 4A is a view showing an example of an opening of a greasing pipe of the greasing device.
Figure 4B:
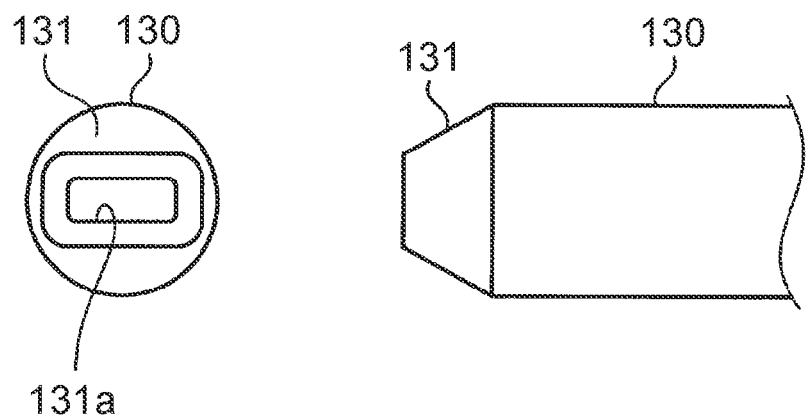
FIG. 4B is a view showing another example of the opening of the greasing pipe.

The leading end portion 131 of the greasing pipe 130 includes the opening 131a which has a tapered shape and through which grease is ejected. For example, the opening 131a of the greasing pipe 130 may be a circular opening 131a as shown in FIG. 4A. Alternatively, the opening 131a may be a flattened opening 131a as shown in FIG. 4B. The greasing pipe 130 including the tapered leading end portion 131 allows for greasing of a portion requiring greasing through a narrow space inside the clutch housing 30.

Figure 6A:
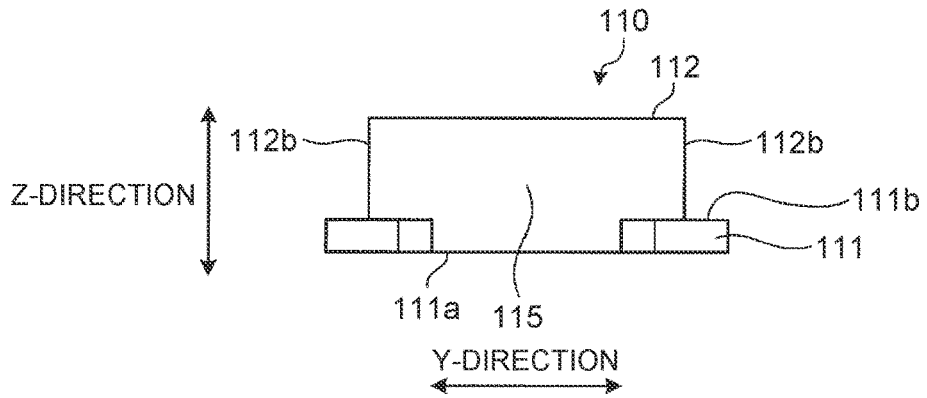
FIG. 6A is a side view of FIG. 5.
Figure 6B:
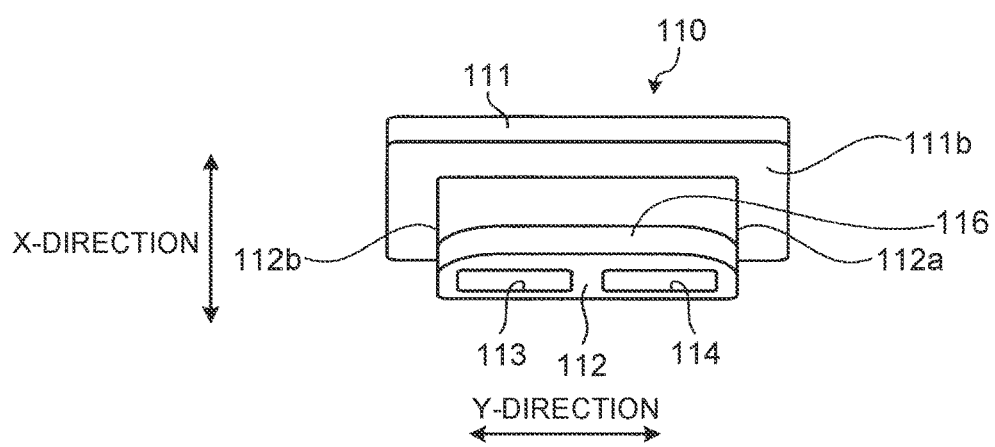
FIG. 6B is a perspective view of the first jig as seen from a rear surface side.
Figure 6C:
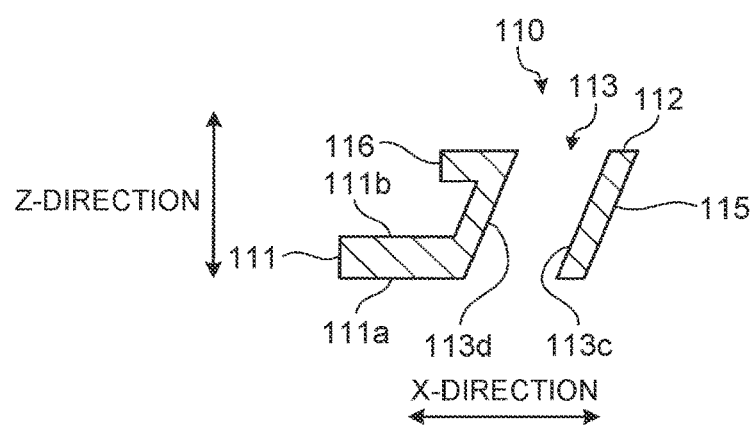
FIG. 6C is a sectional view along line VIC-VIC of FIG. 5.

Here, the first jig 110 will be described in detail with reference to FIG. 5 and FIG. 6A to FIG. 6C. FIG. 5 is a plan view of the base end side of the first jig 110. FIG. 6A is a side view of FIG. 5. FIG. 6B is a perspective view of the first jig 110 as seen from a rear surface side. FIG. 6C is a sectional view along line VIC-VIC of FIG. 5.

As shown in FIG. 5, the first jig 110 includes rectangular openings of the first hole 113 and the second hole 114 on the side of the front surface 111a of the base part 111. An inner surface of the first hole 113 is a surface functioning as a guide surface with which the insertion part 121 comes into contact to position the greasing pipe 130, and the inner surface of the first hole 113 includes a first surface 113a, a second surface 113b, a third surface 113c, and a fourth surface 113d. The first surface 113a and the second surface 113b are surfaces facing each other in the Y-direction and form short sides of the rectangular shape. The third surface 113c and the fourth surface 113d are surfaces facing each other in the X-direction and form long sides of the rectangular shape. An inner surface of the second hole 114 is a surface functioning as a guide surface for positioning the greasing pipe 130, and the inner surface of the second hole 114 includes a first surface 114a, a second surface 114b, a third surface 114c, and a fourth surface 114d. The first surface 114a and the second surface 114b are surfaces facing each other in the Y-direction and form short sides of the rectangular shape. The third surface 114c and the fourth surface 114d are surfaces facing each other in the X-direction and form long sides of the rectangular shape.

Moreover, the first jig 110 includes a contact surface 115 that comes into contact with the flat surface 21d of the clutch release fork 21. The contact surface 115 is a positioning surface, and can position the first jig 110 in the X-direction by coming into contact with the flat surface 21d of the clutch release fork 21. As shown in FIG. 6A, the contact surface 115 has a predetermined width in a width direction of the base part 111 (Y-direction) and extends in a height direction of the protruding part 112 (Z-direction).

As shown in FIG. 6B, a key 116 is provided on the side of a rear surface 111b of the first jig 110. The key 116 is a portion that catches on the clutch housing 30 when the protruding part 112 is inserted into the through-hole 31. The key 116 functions as a portion that retains the first jig 110 in the through-hole 31. Openings of the first hole 113 and the second hole 114 opening in the protruding part 112 also have rectangular shapes as on the base end side. As shown in FIG. 6C, the first hole 113 extends straight through the inside of the protruding part 112.

Figure 8:
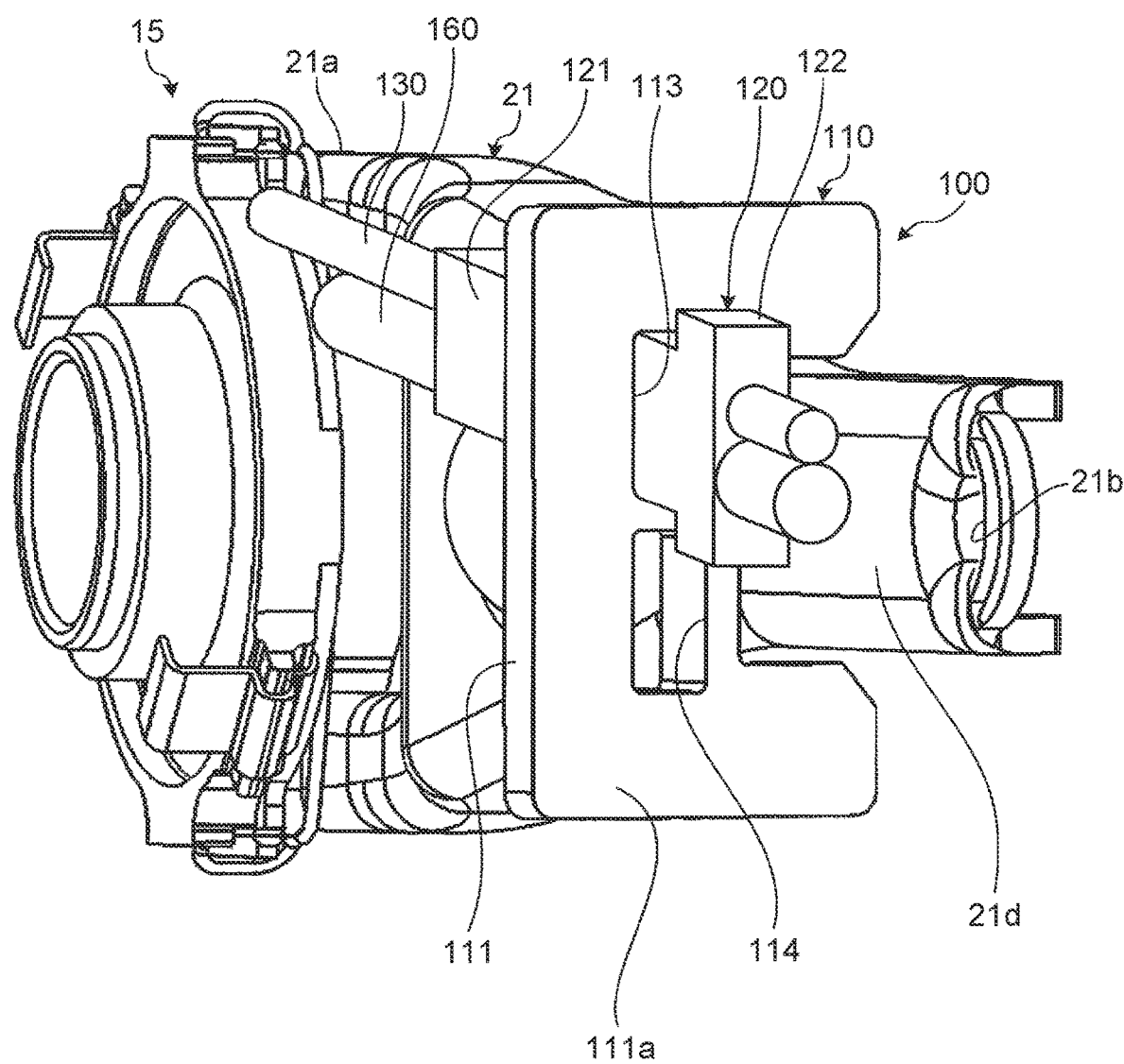
FIG. 8 is a view showing a state where a second jig is inserted into an insertion hole of the first jig and the greasing pipe extends toward a pressing part of a clutch release fork.
Figure 9:
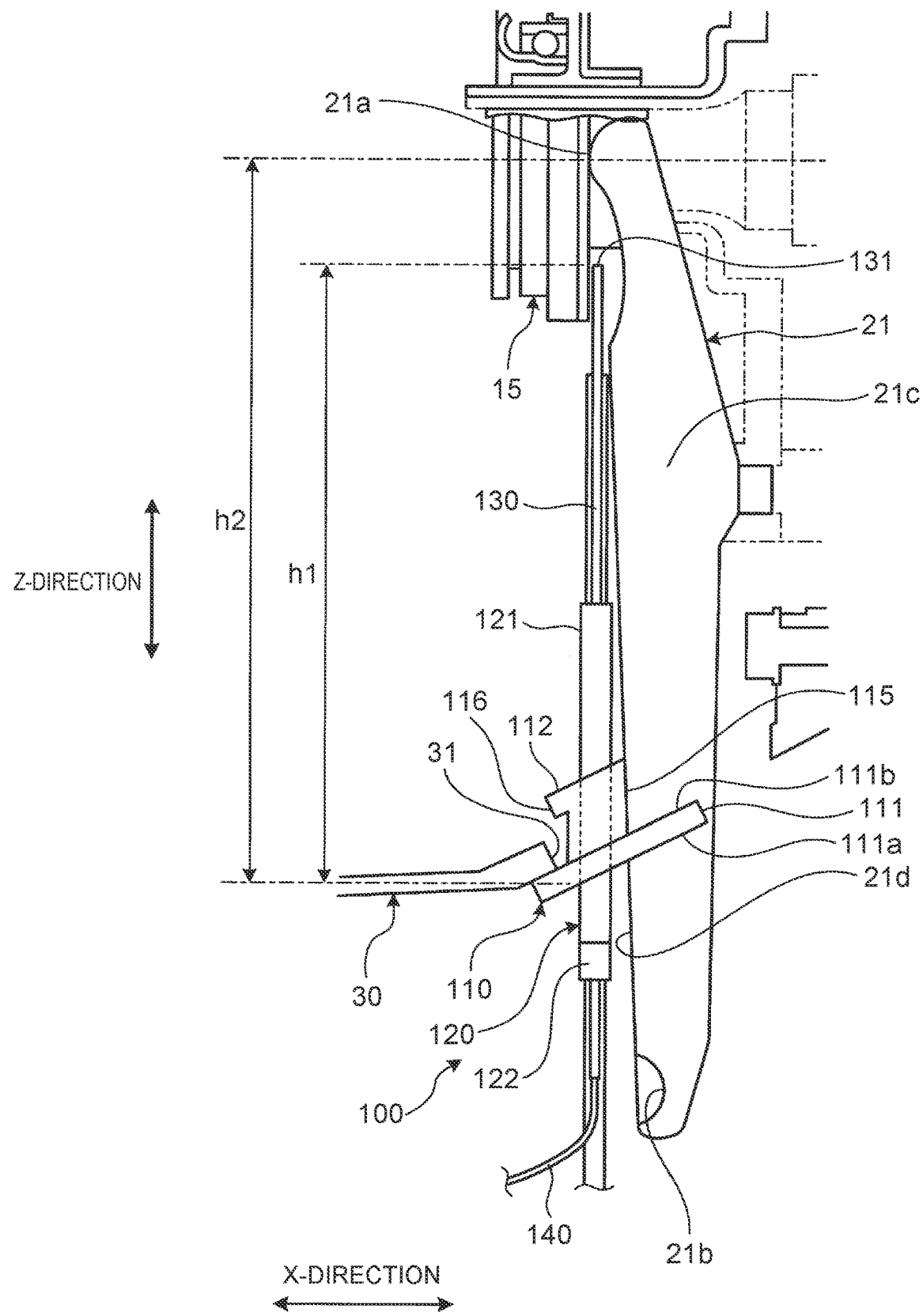
FIG. 9 is a view illustrating a height position of a leading end portion of the greasing pipe.

Next, a method of greasing by the greasing device 100 will be described with reference to FIG. 7 to FIG. 9. FIG. 7 is a view showing a state where the first jig 110 is mounted in the through-hole 31 of the clutch housing 30. FIG. 8 is a view showing a state where the second jig 120 is inserted into the insertion hole of the first jig 110 and the greasing pipe 130 extends toward the pressing part 21a of the clutch release fork 21. FIG. 9 is a view illustrating the height position of the leading end portion 131 of the greasing pipe 130. The Z-direction indicated in FIG. 9 represents the height direction. During greasing maintenance, the fork boot 32 is removed, so that the greasing pipe 130 can be approached through the through-hole 31.

As a first step, the first jig 110 is mounted in the through-hole 31 of the clutch housing 30. As shown in FIG. 7, in the state where the first jig 110 is mounted in the through-hole 31, the contact surface 115 comes into contact with the flat surface 21d of the clutch release fork 21 and thereby the first jig 110 is positioned in the X-direction. Moreover, in this state, side surfaces 112a, 112b of the protruding part 112 of the first jig 110 come into contact with inner surfaces 31a, 31b of the through-hole 31 and thereby the first jig 110 is positioned also in a width direction of the opening that is the Y-direction.

To describe the first step in detail, first, the side surfaces 112a, 112b come into contact with the inner surfaces 31a, 31b while the protruding part 112 is inserted into the through-hole 31, and thereby the first jig 110 is positioned in the Y-direction. Then, with the protruding part 112 kept inserted in the through-hole 31, the first jig 110 can be moved in the X-direction to a position at which the contact surface 115 that has not been in contact with the clutch release fork 21 comes into contact with the flat surface 21d of the clutch release fork 21.

As a step following the first step, an insertion step of inserting the greasing pipe 130 and the second jig 120 into the insertion hole of the first jig 110 mounted on the clutch housing 30 is performed. In this insertion step, a step of inserting the second jig 120 in two stages is performed to insert the second jig 120 into the insertion hole of the first jig 110. Side surfaces 121a, 121b of the insertion part 121 of the second jig 120 bear a marking-off line (not shown) at a position a predetermined distance away from the leading end side. An outer periphery of the insertion part 121 has a rectangular shape. The side surfaces 121a, 121b form short sides of the rectangular shape. The side surface 121a is one surface in the Y-direction and the side surface 121b is the other surface in the Y-direction. The rectangular shape of the insertion part 121 is smaller than the rectangular shape of the opening of the first hole 113 and the rectangular shape of the opening of the second hole 114.

As shown in FIG. 8, when the insertion part 121 of the second jig 120 is inserted into the first hole 113 of the first jig 110, the greasing pipe 130 extends toward the pressing part 21a of the clutch release fork 21 that is the portion requiring greasing. Since the pressing part 21a has a two-pronged structure, the greasing pipe 130 inserted into the first hole 113 extends toward one prong of the pressing part 21a. In some cases, it is necessary for the greasing pipe 130 to circumvent obstacles inside the clutch housing 30 on the way to the vicinity of the pressing part 21a of the clutch release fork 21. Examples of such obstacles include a clip that is a component of the release bearing 15. The clip is provided near the two-pronged portion of the clutch release fork 21, and it is desirable to prevent the greasing pipe 130 from coming into contact with the clip on the way to the pressing part 21a.

In a second step as a first-half step of the insertion step, the insertion part 121 of the second jig 120 is inserted into the insertion hole of the first jig 110 up to the position of the marking-off lines. In the inserted state in this second step, the second jig 120 can be moved inside the insertion hole so as to shift the position of the second jig 120 relative to the first jig 110, such that the greasing pipe 130 and the endoscope 160 can circumvent obstacles inside the clutch housing 30. Specifically, in a third step as a circumventing movement step, the second jig 120 is moved so as to circumvent inner components of the clutch housing 30.

In the third step, there is a clearance between the side surfaces 121a, 121b of the insertion part 121 and the inner surface of the first hole 113 in the state where the insertion part 121 is inserted into the first hole 113. Similarly, there is a clearance between the side surfaces 121a, 121b of the insertion part 121 and the inner surface of the second hole 114 in the state where the insertion part 121 is inserted into the second hole 114. Therefore, if the second jig 120 has been inserted into the insertion hole up to the position of the marking-off lines, the greasing pipe 130 can be positioned at such a height position that the greasing pipe 130 does not come into contact with the clip of the release bearing 15 and can circumvent the inner components including the clip. In this case, one can hold the second jig 120 in his or her hand at the side of the stopper 122 and move the insertion part 121 so as to sway the leading end of the insertion part 121 in the Y-direction.

As shown in FIG. 9, a height h1 is the height position of the leading end portion 131 of the greasing pipe 130 at which the clip of the release bearing 15 can be circumvented. When the leading end portion 131 is at this height position, insertion of the greasing pipe 130 is stopped and the position of the leading end portion 131 is controlled so as to circumvent the clip of the release bearing 15. The height h1 also represents the amount of insertion (the amount of stroke).

For example, in the third step, from the state where the side surface 121b of the insertion part 121 is in contact with the first surface 113a of the first hole 113, the side surface 121a of the insertion part 121 is brought into contact with the second surface 113b of the first hole 113, with which the side surface 121a has not been in contact, as a movement of the greasing pipe 130 to circumvent obstacles inside the clutch housing 30. In this case, the second jig 120 is moved so as to slide the insertion part 121 over the third surface 113c of the first hole 113 until the side surface 121a comes into contact with the second surface 113b. This sliding movement includes an action of moving the insertion part 121 parallel to the Y-direction and a swinging action of swaying the leading end portion 131 in a right-left direction. As a result, the greasing pipe 130 is positioned so as not to come into contact with the clip.

After the greasing pipe 130 has been thus positioned at such a position that obstacles inside the clutch housing 30 can be circumvented, the leading end portion 131 of the greasing pipe 130 is approached again toward the portion requiring greasing. Specifically, the step of inserting the second jig 120 is resumed, and the insertion part 121 is inserted into the through-hole 31 up to a position at which the stopper 122 of the second jig 120 comes into contact with the base part 111 of the first jig 110. That the stopper 122 of the second jig 120 is in the state of being in contact with the first jig 110 means that the leading end portion 131 of the greasing pipe 130 has been inserted up to a predetermined target position inside the clutch housing 30. Therefore, in a fourth step as a latter-half step of the insertion step, the insertion part 121 is inserted beyond the position of the marking-off lines to thereby insert the leading end portion 131 of the greasing pipe 130 to the portion requiring greasing.

As shown in FIG. 9, in the fourth step, the leading end portion 131 of the greasing pipe 130 reaches a height h2 at which one prong of the two-pronged pressing part 21a is located. Thus, it is possible to position the leading end portion 131 of the greasing pipe 130 in the vicinity of the pressing part 21a of the clutch release fork 21. The height h2 represents a larger amount of insertion than the height h1.

Then, in a fifth step as a grease feeding step, grease is fed through the opening 131a of the greasing pipe 130. In the fifth step, when an appropriate amount of grease is fed from the greaser 150 connected to the greasing pipe 130, an appropriate amount of grease is ejected through the leading end portion 131 of the greasing pipe 130 and the grease is applied to the pressing part 21a. In this case, the greasing pipe 130 is filled with grease from the greaser 150 in advance. Therefore, once the leading end portion 131 of the greasing pipe 130 is positioned at a desired position, grease is smoothly fed as the greaser 150 is manipulated.

Upon completion of greasing in the fifth step, the greasing pipe 130 is pulled out in a sixth step as a pulling-out step. In the sixth step, the grease at the leading end portion 131 of the greasing pipe 130 is cut off while the first jig 110 is kept mounted in the through-hole 31. Thereafter, the second jig 120 is pulled out of the through-hole 31 and the leading end portion 131 of the greasing pipe 130 is also pulled out through the through-hole 31 to the outside of the clutch housing 30.

For example, the second jig 120 is pulled out of the insertion hole of the first jig 110. To pull the second jig 120 out of the insertion hole of the first jig 110, the second jig 120 can be shaken in the right-left direction using the clearance between the insertion hole and the insertion part 121. Thus, grease can be prevented from adhering to a portion or a component other than the portion requiring greasing.

When the process from the first step to the fifth step described above is a process involving the first hole 113, the process from the second step to the fifth step for the second hole 114 will be performed with the first jig 110 kept in the mounted state. Thus, both prongs of the two-pronged pressing part 21a can be greased.

When no obstacles are present on the way to the portion requiring greasing inside the clutch housing 30, the above-described second step and third step may be omitted. In this case, the marking-off lines for the second jig 120 are not required. The fourth step may be performed after the first step, and the insertion part 121 of the second jig 120 may be continuously inserted into the insertion hole of the first jig 110 until the stopper 122 comes into contact with the first jig 110.

As has been described above, the greasing device 100 of the first embodiment allows for greasing of the pressing part 21a of the clutch release fork 21 without removing the clutch housing 30 from the vehicle. Thus, greasing maintenance work is made easy and the work efficiency is improved.

The greasing pipe 130 has been described as being made of metal in the first embodiment, but the greasing pipe 130 may instead be made of elastic material. The greasing pipe 130 made of elastic material can be deformed along the shape of a narrow space during greasing of such a space. Further, the shape of the greasing pipe 130 is not limited to a linear shape but may instead be a curvilinear shape. The structure of the greaser 150 is not limited to the one having the cylinder and the piston, and any structure that can feed grease to the greasing pipe 130 may be adopted.

Next, a first modified example to a third modified example that are modified examples of the first jig will be described. Here, the modified examples of the first jig 110 will be described with reference to FIG. 10 to FIG. 13.

Figure 10:
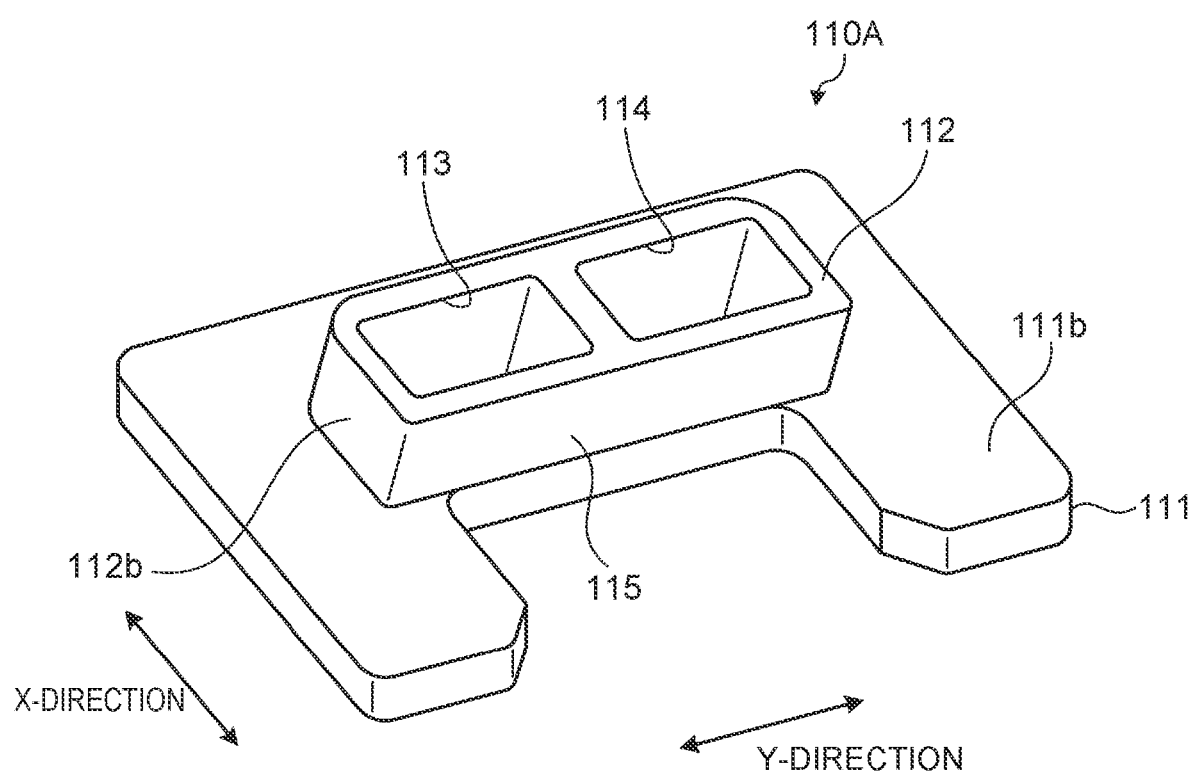
FIG. 10 is a view schematically showing a first modified example of the first jig.

First, the first modified example of the first jig will be described. FIG. 10 is a view schematically showing a first jig 110A of the first modified example. As shown in FIG. 10, the first jig 110A of the first modified example is made of elastic material, such as ethylene-propylene-diene rubber (EPDM), and has a structure not including a key on the rear surface side of the protruding part 112. The size of the protruding part 112 is set such that interference occurs between the protruding part 112 and the through-hole 31. That is, the protruding part 112 is interference-fitted in the through-hole 31. The protruding part 112 is formed in such a size that the side surfaces 112a, 112b can fit on the inner surfaces 31a, 31b of the through-hole 31. This eliminates the need for the key.

Figure 11A:
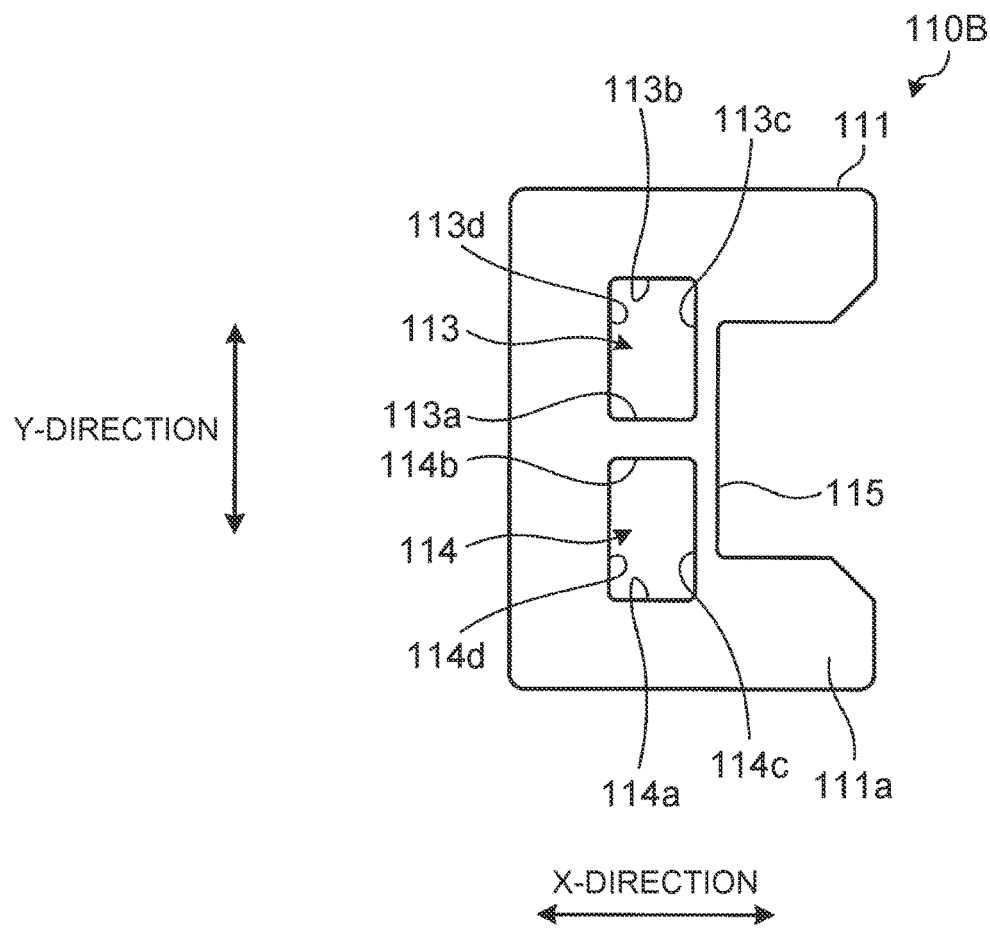
FIG. 11A is a view schematically showing a second modified example of the first jig.
Figure 11B:
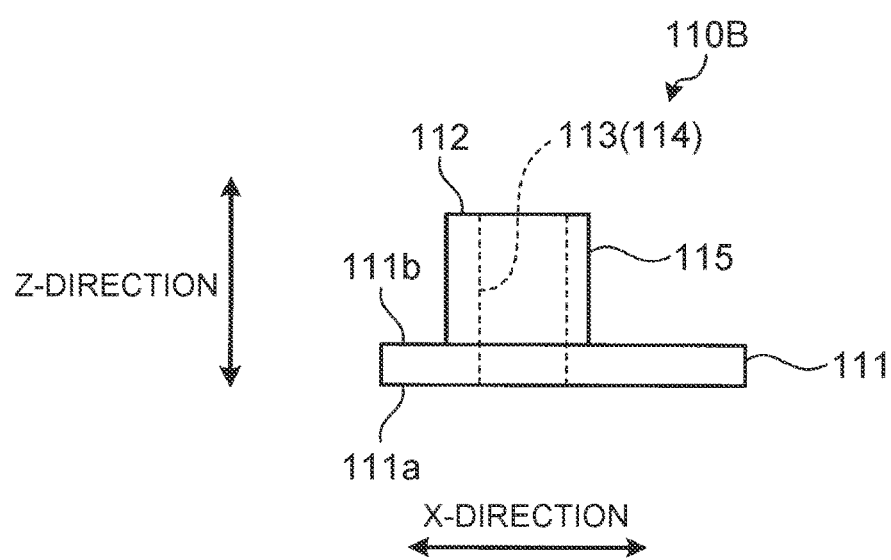
FIG. 11B is a view illustrating the shape of the second modified example of the first jig.

Next, the second modified example of the first jig will be described. FIG. 11A is a view schematically showing a first jig 110B of the second modified example. FIG. 11B is a view illustrating the shape of the first jig 110B of the second modified example. As shown in FIG. 11A and FIG. 11B, in the first jig 110B of the second modified example, the protruding part 112 extends perpendicularly to the rear surface 111b of the base part 111. Moreover, the first hole 113 and the second hole 114 extend straight in a direction perpendicular to the flat plate of the base part 111. The protruding part 112 of the first jig 110B is also interference-fitted in the through-hole 31.

Figure 12:
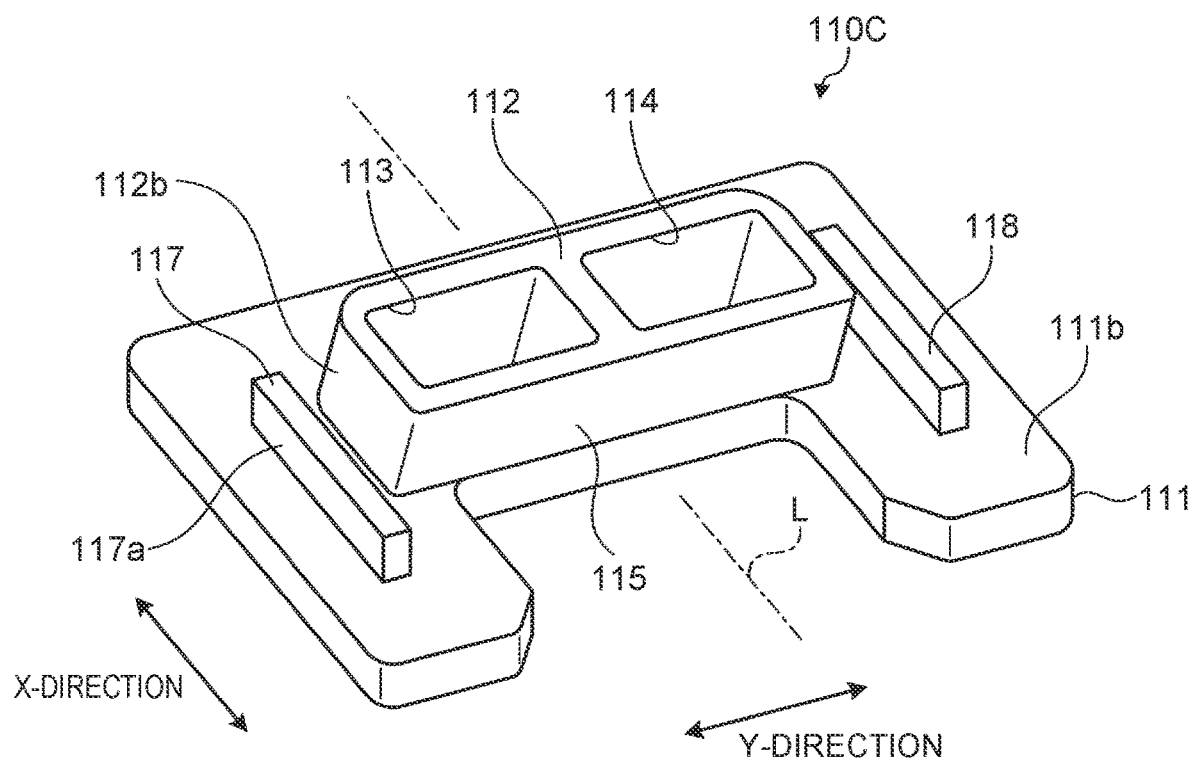
FIG. 12 is a view schematically showing a third modified example of the first jig.

Next, the third modified example of the first jig will be described. FIG. 12 is a view schematically showing a first jig 110C of the third modified example. As shown in FIG. 12, in the first jig 110C of the third modified example, a pair of step portions 117, 118 is provided on the side of the rear surface 111b of the base part 111. The step portions 117, 118 are formed one on each side of the protruding part 112 and shaped so as to protrude from the rear surface 111b. With respect to a center line L in the Y-direction, a side wall surface 117a of the step portion 117 is provided on an outer side of the side surface 112b of the protruding part 112. A side wall surface of the step portion 118 located on the opposite side of the center line L is provided on an outer side of the side surface 112a (shown in FIG. 6B) of the protruding part 112. The height of the step portions 117, 118 is shorter than that of the protruding part 112.

Since the protruding part 112 and the pair of step portions 117, 118 are different from each other in the dimension in the Y-direction, the first jig 110C can adapt to the through-holes 31 having different opening shapes. When the opening of the through-hole 31 is small, the protruding part 112 fits in the through-hole 31. When the opening of the through-hole 31 is large, the protruding part 112 cannot fit in the through-hole 31 but the pair of step portions 117, 118 fits in the through-hole 31.

Figure 13:
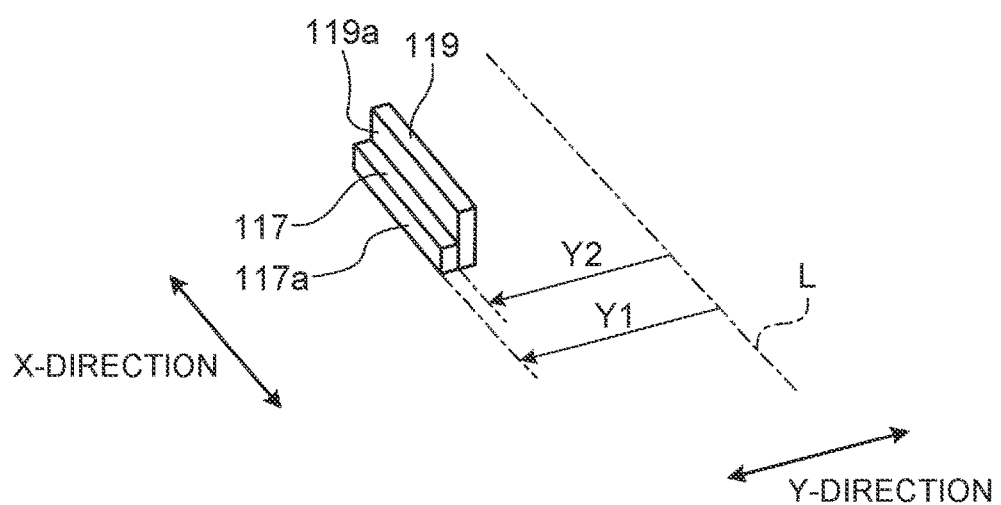
FIG. 13 is a view schematically showing a modified example of a step portion shown in FIG. 12.

FIG. 13 is a view schematically showing a modified example of the step portion. As shown in FIG. 13, the step portion included in the third modified example may be formed as a plurality of steps. The side wall surface 117a of the step portion 117 forming a first step and a side wall surface 119a of a step portion 119 forming a second step are provided at positions farther away from the center line L in the Y-direction than the side surface 112b of the protruding part 112 is (provided at positions on the outer side of the side surface 112b in the width direction). The side wall surface 117a of the first step is provided at a position Y1 farther away than the side wall surface 119a of the second step is. The side wall surface 119a of the second step is provided at a position Y2 farther away than the side surface 112b is. As the side wall surface 117a or the side wall surface 119a comes into contact with the inner surface 31a of the through-hole 31, the first jig 110A is positioned in the Y-direction.

Next, a second embodiment of the present disclosure will be described. A greasing device 100A of the second embodiment will be described. In the second embodiment, the greasing device 100A has a structure integrating the second jig 120 with a first jig 110D. In the description of the second embodiment, the same components as in the first embodiment will be denoted by the same reference signs as in the first embodiment while the description thereof will be omitted.

Figure 14:
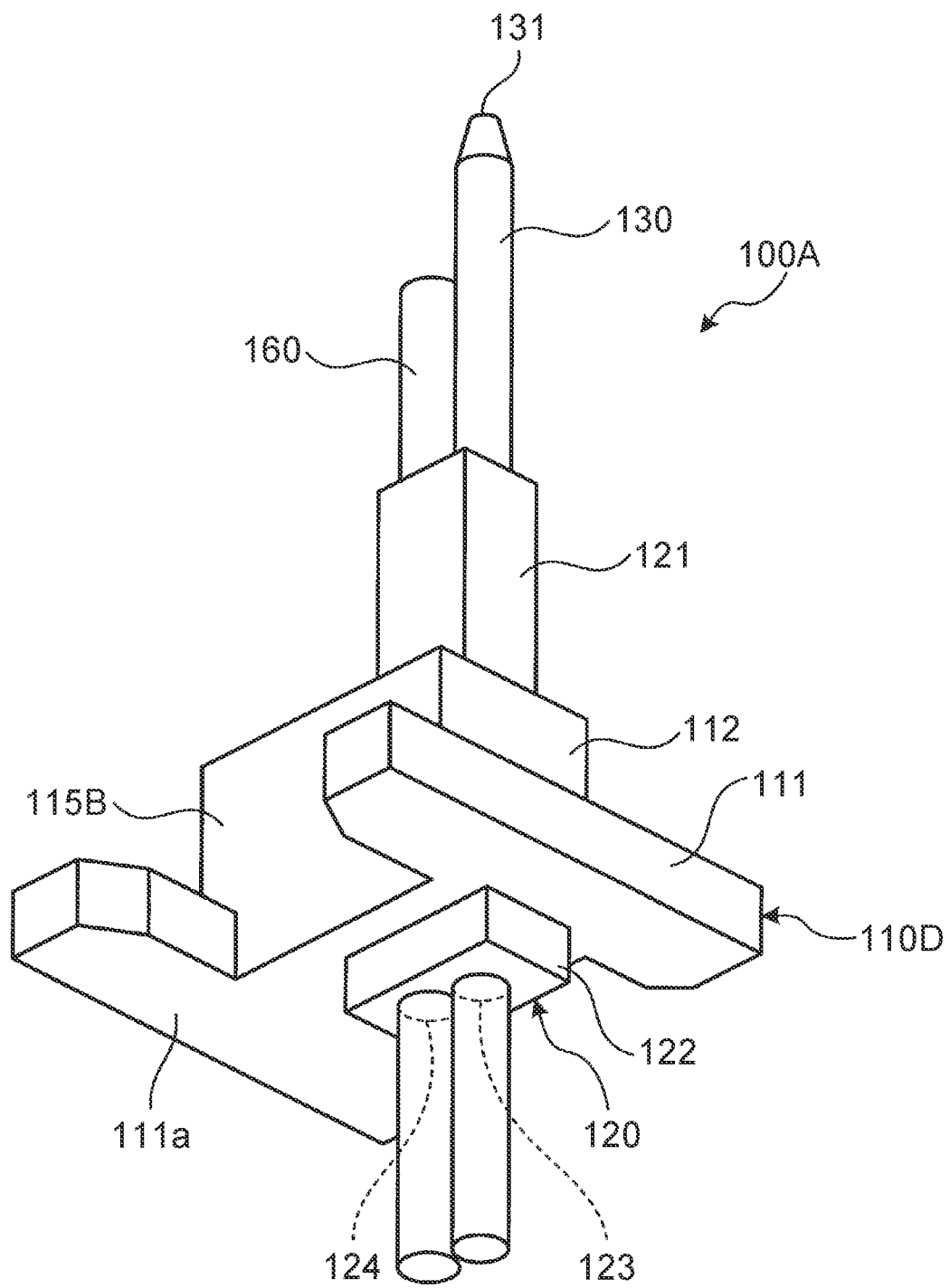
FIG. 14 is a view schematically showing a greasing device of a second embodiment of the present disclosure.

FIG. 14 is a view schematically showing the greasing device 100A of the second embodiment. As shown in FIG. 14, the greasing device 100A of the second embodiment has a structure integrating the first jig 110D and the second jig 120, with the greasing pipe 130 fixed to the first jig 110D.

Figure 15A:
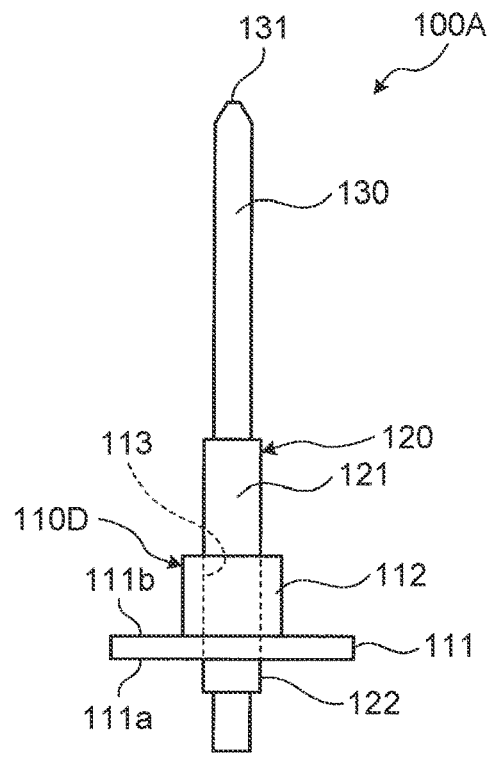
FIG. 15A is a side view of FIG. 14.
Figure 15B:
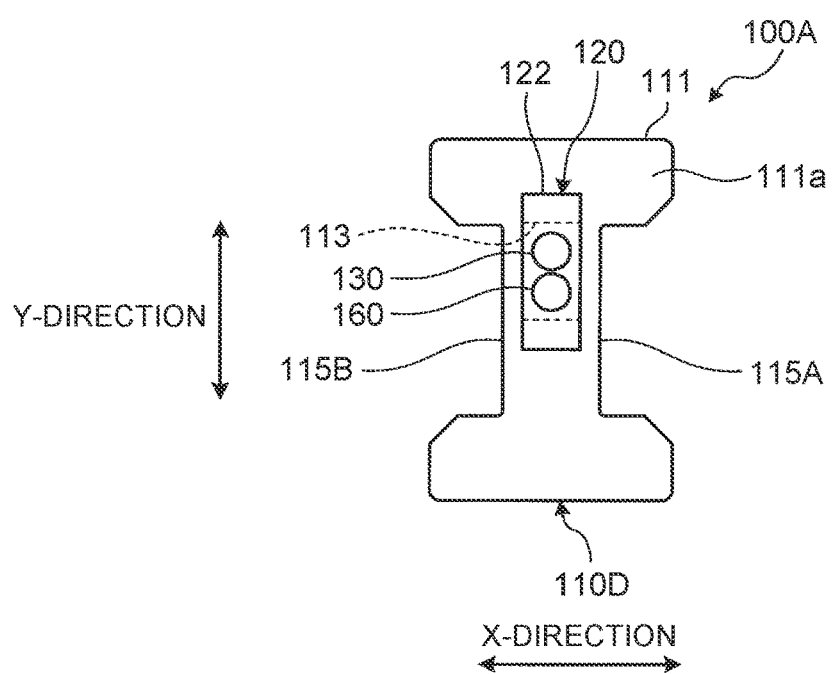
FIG. 15B is a bottom view of FIG. 14.

FIG. 15A is a side view of FIG. 14. FIG. 15B is a bottom view of FIG. 14. As shown in FIG. 15A and FIG. 15B, the stopper 122 and the base part 111 of the first jig 110D are fixed to each other in a state where the insertion part 121 is inserted into the first hole 113 of the first jig 110D. As for the fixing method of the first jig 110D and the second jig 120, these jigs are joined together with an adhesive, such as a glue. When both the first jig 110D and the second jig 120 are made of metal, these jigs may be integrated by welding etc.

The first jig 110D includes two surfaces that come into contact with the flat surface 21d of the clutch release fork 21 as positioning surfaces. As shown in FIG. 15B, the first jig 110D includes a first contact surface 115A and a second contact surface 115B.

Figure 16A:
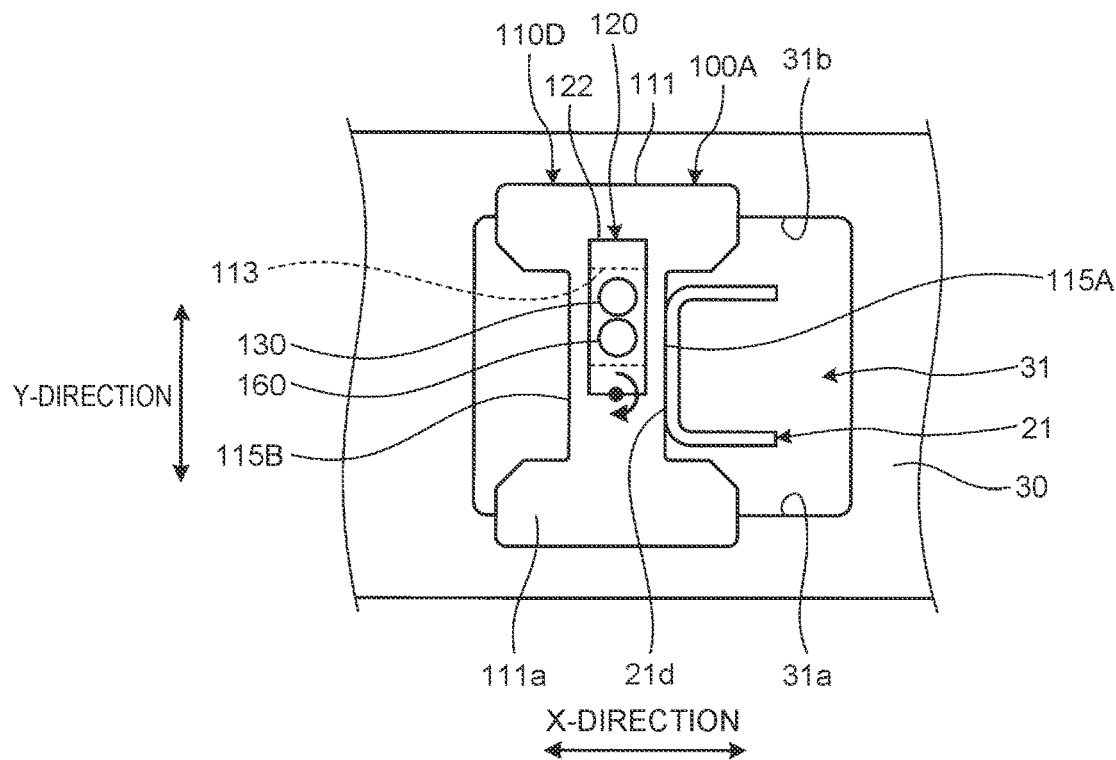
FIG. 16A is a view showing a first state where a jig of the second embodiment is mounted in the through-hole.
Figure 16B:
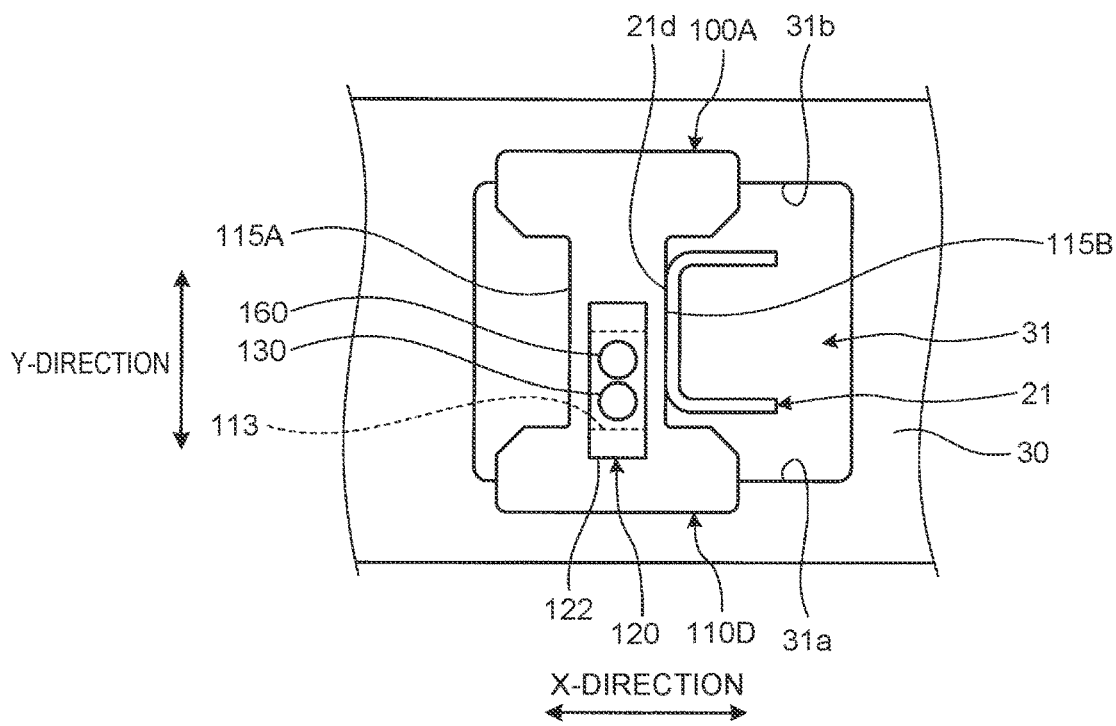
FIG. 16B is a view showing a second state where the jig of the second embodiment is mounted in the through-hole.

FIG. 16A is a view showing a first state where the jig of the second embodiment is mounted in the through-hole 31. FIG. 16B is a view showing a second state where the jig of the second embodiment is mounted in the through-hole 31. The second state shown in FIG. 16B represents a state where the jig is temporarily removed from the first state shown in FIG. 16A and then turned 180 degrees. As shown in FIG. 16A, grease is fed through the greasing pipe 130 in the first state where the first contact surface 115A is in contact with the flat surface 21d of the clutch release fork 21. Then, the first jig 110D is removed from the through-hole 31 and turned 180 degrees around a center axis in the Z-direction, and grease is fed through the greasing pipe 130 in the second state where the second contact surface 115B of the first jig 110D is in contact with the flat surface 21d of the clutch release fork 21.

Here, a method of greasing by the greasing device 100A of the second embodiment will be described.

First, as a first step, the leading end portion 131 of the greasing pipe 130 is inserted into the clutch housing 30 through the through-hole 31, and the insertion part 121 is inserted into the through-hole 31 up to the position of the marking-off lines on the side surfaces 121a, 121b of the second jig 120. The insertion part 121 can be inserted up to a position at which the position of the opening of the through-hole 31 and the position of the marking-off lines are aligned.

As a second step, a movement of circumventing obstacles inside the clutch housing 30 is performed while the insertion position reached in the first step is maintained. For example, the first jig 110D and the second jig 120 are moved so as to circumvent obstacles, in the state where the first contact surface 115A of the first jig 110D is in contact with the flat surface 21d of the clutch release fork 21. In this case, a positioning step of bringing the first contact surface 115A of the first jig 110D into contact with the flat surface 21d of the clutch release fork 21 is performed in a state where the protruding part 112 of the first jig 110D is not yet inserted into the through-hole 31.

As a third step, the protruding part 112 is inserted into the through-hole 31 with the first contact surface 115A placed along the flat surface 21d of the clutch release fork 21, until the base part 111 comes into contact with the clutch housing 30. In the third step, the insertion part 121 is inserted into the through-hole 31 and the rear surface 111b of the base part 111 is brought into contact with the clutch housing 30, while the state where the first contact surface 115A is in contact with the flat surface 21d of the clutch release fork 21 is maintained. That the base part 111 of the first jig 110D is in the state of being in contact with an outer wall of the clutch housing 30 means that the leading end portion 131 of the greasing pipe 130 has been inserted to a predetermined target position inside the clutch housing 30.

In this state, as a fourth step, an appropriate amount of grease is fed from the greaser 150 connected to the greasing pipe 130. As a result, an appropriate amount of grease is ejected through the leading end portion 131 of the greasing pipe 130, and the grease is applied to the pressing part 21a of the clutch release fork 21 that is the portion requiring greasing.

Upon completion of greasing in the fourth step, the greasing pipe 130 is pulled out as a fifth step. In this case, the second jig 120 is pulled out of the through-hole 31 while the grease at the leading end portion 131 of the greasing pipe 130 is cut off. Since the first jig 110D and the second jig 120 are integrated, one can remove the first jig 110D along with the greasing pipe 130 from the through-hole 31 when pulling the greasing pipe 130 out of the through-hole 31 upon completion of greasing. This can prevent failure to remove the first jig 110D during greasing maintenance. Then, the first jig 110D is turned 180 degrees around the center axis in the Z-direction. Thus, grease can be fed through the greasing pipe 130 based on the above-described steps, in the second state where the second contact surface 115B is in contact with the flat surface 21d of the clutch release fork 21.

When no obstacles are present on the way to the portion requiring greasing inside the clutch housing 30, the above-described first step and second step can be omitted. In this case, the marking-off lines for the second jig 120 are not required, and the process can be started from the third step to insert the insertion part 121 until the base part 111 of the first jig 110D comes into contact with the clutch housing 30.

As has been described above, the greasing device 100A of the second embodiment allows for greasing of the pressing part 21a of the clutch release fork 21 without removing the clutch housing 30 from the vehicle. Thus, greasing maintenance work is made easy and the work efficiency is improved. The greasing device 100A is useful when no obstacles are present on the way from the through-hole 31 to the pressing part 21a of the clutch release fork 21 inside the clutch housing 30.

What is claimed is:

1. A greasing device configured to feed grease to a contact portion between a release bearing and a pressing part of a clutch release fork in a clutch release mechanism configured such that the pressing part presses the release bearing, the greasing device comprising:
   a greasing pipe configured to extend from an outside of a clutch housing that houses a clutch main body including the release bearing toward the contact portion through a through-hole provided in the clutch housing, and to feed grease to the contact portion; and
   a positioning part configured to position the greasing pipe by coming into contact with each of an inner surface of the through-hole and a flat surface of the clutch release fork.

2. The greasing device according to claim 1, wherein:
   the positioning part includes a first jig and a second jig, the first jig being provided with two or more positioning holes for positioning the greasing pipe, the second jig including an insertion part that is inserted into one of the two or more positioning holes and being configured such that the greasing pipe is positioned as the insertion part comes into contact with an inner surface of the one of the two or more positioning holes; and
   the greasing pipe is fixed to the second jig and extends along the insertion part.

3. The greasing device according to claim 2, wherein:
   the pressing part has a two-pronged structure; and
   the two or more positioning holes include a first hole and a second hole, the insertion part being inserted into the first hole to grease one prong of the two-pronged structure, the insertion part being inserted into the second hole to grease the other prong of the two-pronged structure.

4. The greasing device according to claim 2, wherein the inner surface of the one of the two or more positioning holes includes a guide surface configured to allow the greasing pipe to be positioned at such a position that the greasing pipe does not come into contact with a component of the release bearing.

5. The greasing device according to claim 1, wherein:
   the greasing pipe is integrated with the positioning part;
   the pressing part has a two-pronged structure; and
   the positioning part includes a first contact surface and a second contact surface, the first contact surface coming into contact with the flat surface of the clutch release fork in a first state where the positioning part is mounted in the through-hole to grease one prong of the two-pronged structure, the second contact surface coming into contact with the flat surface of the clutch release fork in a second state where the positioning part is mounted in the through-hole to grease the other prong of the two-pronged structure.

6. The greasing device according to claim 5, wherein the second state is a state where the integrated greasing pipe and positioning part are turned 180 degrees from the first state.

7. The greasing device according to claim 1, wherein a leading end portion of the greasing pipe has an opening shaped so as to taper toward a leading end.

8. The greasing device according to claim 1, wherein the greasing pipe is made of metal.

9. The greasing device according to claim 1, wherein the greasing pipe is made of elastic material.

10. The greasing device according to claim 1, wherein the greasing device includes an imaging device configured to take an image of an internal structure of the clutch housing on a leading end side of the greasing pipe.

11. A greasing device for feeding grease to a greasing requiring part accommodated inside a housing, the greasing device comprising:
    a first jig;
    a second jig; and
    a greasing portion, wherein:
      the first jig has a base portion that abuts on the housing, and an insertion hole that penetrates the base portion,
      the second jig has an insertion portion that is inserted into the insertion hole of the first jig, and a stopper portion that comes into abutment on the base portion of the first jig when the insertion portion is inserted into the insertion hole, and
      the greasing portion feeds grease to the greasing requiring part while being positioned by the first jig and the second jig.

12. The greasing device according to claim 11, wherein the greasing portion is a greasing pipe inserted through the insertion portion of the second jig.

13. The greasing device according to claim 12, wherein:
    the housing is provided with a hole,
    the first jig has a protrusion portion that protrudes from the base portion and that is inserted into the hole of the housing, and
    a lateral surface of the protrusion portion abuts on an inner surface of the hole.

14. The greasing device according to claim 13, wherein:
    the first jig has a key portion that holds the first jig on the housing when the protrusion portion is inserted into the hole of the housing, and
    the key portion is provided on a tip side of the protrusion portion, and is shaped in such a manner as to extend outward of an opening portion of the hole with the protrusion portion inserted in the hole.

15. The greasing device according to claim 12, wherein the first jig is provided with a plurality of insertion holes identical to the insertion hole.

16. The greasing device according to claim 12, further comprising:
    photographing means for photographing an internal structure of the housing on a tip side of the greasing pipe.

17. A greasing method for feeding grease to a greasing requiring part accommodated inside a housing, the greasing method comprising:
    a first step of attaching a first jig having a base portion and an insertion hole to the housing;
    a second step of inserting a greasing pipe and a second jig into the insertion hole of the first jig with the first jig attached to the housing; and
    a third step of feeding grease to the greasing requiring part from the greasing pipe,
    wherein the second step includes a step of inserting an insertion portion of the second jig into the insertion hole of the first jig to a position where a stopper portion of the second jig abuts on the base portion of the first jig.

18. The greasing method according to claim 17, wherein the insertion hole has a first hole and a second hole that penetrate the base portion, and further comprising:
    a step of performing the second step and the third step for the second hole with the first jig attached to the housing, after performing the first to third steps for the first hole.

19. The greasing method according to claim 17, wherein:
    the housing is provided with a hole, the first jig has a protrusion portion that protrudes from the base portion and that is inserted into the hole of the housing, and a key portion that holds the first jig on the housing when the protrusion portion is inserted into the hole of the housing,
the key portion is provided on a tip side of the protrusion portion, and is shaped in such a manner as to extend outward of an opening portion of the hole with the protrusion portion inserted in the hole, and
the first step includes a step of holding the first jig on the housing by the key portion.

20. The greasing method according to claim 17, further comprising:
a step of photographing an internal structure of the housing by photographing means for photographing the internal structure of the housing on a tip side of the greasing pipe.

\* \* \* \* \*